United States Patent
Kim et al.

(10) Patent No.: US 11,378,966 B2
(45) Date of Patent: Jul. 5, 2022

(54) ROBOT CLEANER FOR RECOGNIZING STUCK SITUATION THROUGH ARTIFICIAL INTELLIGENCE AND METHOD OF OPERATING THE SAME

(71) Applicant: LG ELECTRONICS INC., Seoul (KR)

(72) Inventors: Kokeun Kim, Seoul (KR); Suyeon Kim, Seoul (KR); Kamin Lee, Seoul (KR); Seungah Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 293 days.

(21) Appl. No.: 16/567,805

(22) Filed: Sep. 11, 2019

(65) Prior Publication Data

US 2020/0004260 A1    Jan. 2, 2020

(30) Foreign Application Priority Data

Aug. 27, 2019 (KR) .................. 10-2019-0105364

(51) Int. Cl.
*G05D 1/02* (2020.01)
*G06N 3/08* (2006.01)
(Continued)

(52) U.S. Cl.
CPC ........ *G05D 1/0221* (2013.01); *B25J 11/0085* (2013.01); *G05D 1/0251* (2013.01);
(Continued)

(58) Field of Classification Search
CPC .... B25J 11/0085; B25J 9/1666; B25J 9/1676; B25J 9/161; B25J 5/007; B25J 9/126;
(Continued)

(56) References Cited

U.S. PATENT DOCUMENTS 6,941,199 B1 * 9/2005 Bottomley ............ B60L 3/0015
    701/23
9,008,840 B1 * 4/2015 Ponulak ................. G06N 3/049
    700/250
(Continued)

FOREIGN PATENT DOCUMENTS

CN        107544524 A      1/2018
CN        108803588 A      11/2018
(Continued)

OTHER PUBLICATIONS

Liu et al., "Sensor-based complete coverage path planning in dynamic environment for cleaning robot," CAAI Transactions on Intelligence Technology, vol. 3, Issue 1, 2018, pp. 65-72.

*Primary Examiner* — Jeff A Burke
*Assistant Examiner* — Joshua Alexander Garza
(74) *Attorney, Agent, or Firm* — Birch, Stewart, Kolasch & Birch, LLP

(57) ABSTRACT

A robot cleaner for recognizing a stuck situation through artificial intelligence includes a driving unit to drive the robot cleaner, a sensing unit configured to acquire three-dimensional (3D) image data and a bumper event, a memory configured to store a stuck situation recognition model for inferring the stuck situation of the robot cleaner, and a processor configured to convert the 3D image data and the bumper event into surrounding map image data, infer the stuck situation of the robot cleaner from the 3D image data and the bumper event using the stuck situation recognition model, and control the driving unit according to an inference result.

20 Claims, 22 Drawing Sheets

(51) Int. Cl.
*B25J 11/00* (2006.01)
*B25J 1/00* (2006.01)

(52) U.S. Cl.
CPC ............ *G05D 1/0274* (2013.01); *G06N 3/08* (2013.01); *G05D 2201/0215* (2013.01)

(58) Field of Classification Search
CPC .... B25J 19/0075; Y02B 40/00; A47L 9/2805; A47L 9/2852; A47L 2201/04; A47L 11/4061; A47L 11/4011; A47L 11/00; G05D 1/0044; G05D 1/0088; G05D 1/0214; G05D 1/0227; G05D 1/0223; G05D 1/027; G05D 1/0238; G05D 1/0246; G05B 19/4061; G05B 2219/40477
See application file for complete search history.

(56) References Cited

U.S. PATENT DOCUMENTS

| | | | | |
|---|---|---|---|---|
| 10,394,249 | B2* | 8/2019 | Kim | A47L 9/2842 |
| 2015/0032259 | A1 | 1/2015 | Kim et al. | |
| 2017/0332862 | A1 | 11/2017 | Jun et al. | |
| 2018/0000306 | A1* | 1/2018 | Caruso | A47L 11/28 |
| 2019/0320867 | A1 | 10/2019 | Noh et al. | |
| 2020/0016524 | A1 | 1/2020 | Kim | |
| 2020/0174489 | A1* | 6/2020 | Jung | G06K 9/00664 |
| 2020/0401153 | A1* | 12/2020 | Sui | G05D 1/0274 |
| 2020/0409382 | A1* | 12/2020 | Herman | G05D 1/0088 |
| 2021/0026369 | A1* | 1/2021 | Izawa | A47L 9/30 |

FOREIGN PATENT DOCUMENTS

| | | |
|---|---|---|
| CN | 109213137 A | 1/2019 |
| TW | 201825037 A | 7/2018 |
| WO | WO 2019/151846 A2 | 8/2019 |

* cited by examiner

FIG. 11
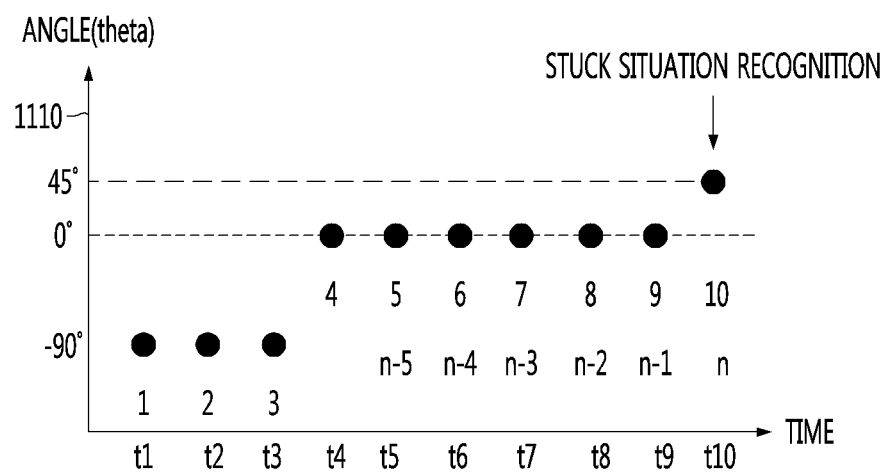
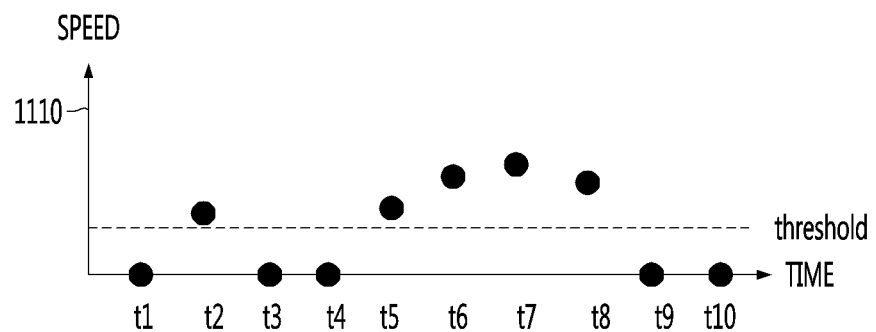

<AFTER EVOLUTION>

| | Self Validation | | |
|---|---|---|---|
| INFERENCE RESULT | Action | Error Check | ADDITIONAL ACTION |
| Normal | EXISTING ACTION | Normal | - |
| | | Abnormal | Re-training |
| Abnormal | EXISTING ACTION(PERIODIC) | Normal | Re-training |
| | | Abnormal | ACTION BEFORE PROBLEM OCCURS |

FIG. 20
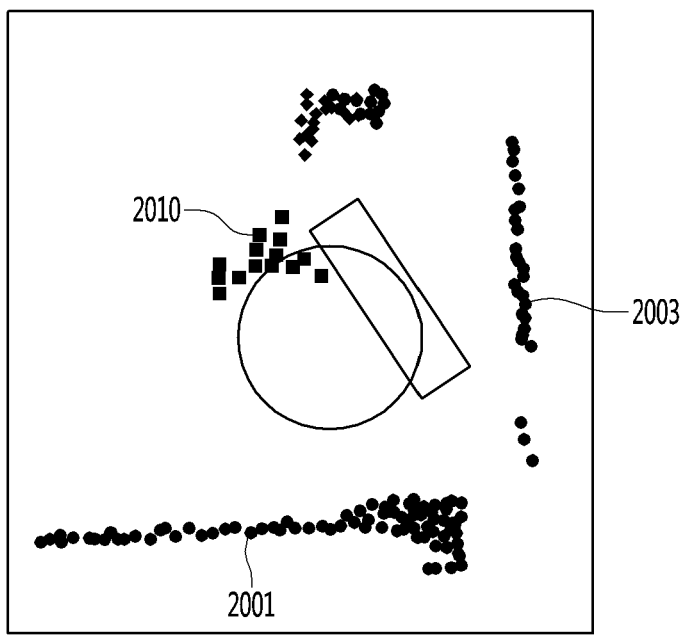
FIG. 21
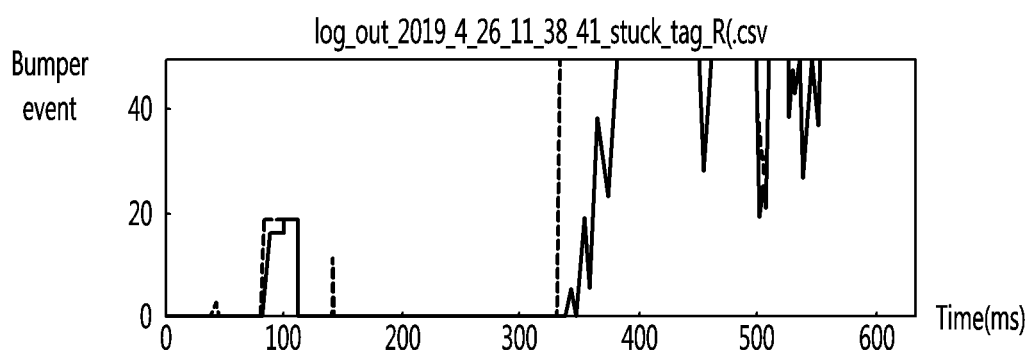
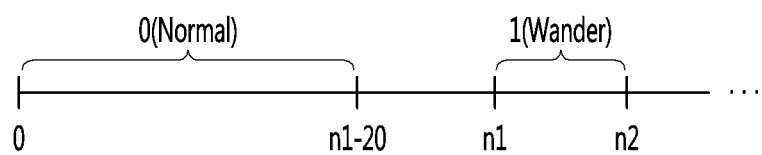

FIG. 24

| Self Validation | | | |
|---|---|---|---|
| Inference result | Action | Error Check | Additional action |
| Normal | Existing traveling | Stuck situation does not occur | - |
| | | Stuck situation occurs | Re-training |
| Stuck | Existing traveling (periodic) | Stuck situation does not occur | Re-training |
| | | Stuck situation occurs | Travels while avoiding obstacle |

ROBOT CLEANER FOR RECOGNIZING STUCK SITUATION THROUGH ARTIFICIAL INTELLIGENCE AND METHOD OF OPERATING THE SAME

CROSS-REFERENCE TO RELATED APPLICATIONS

This application claims priority to Korean Patent Application No. 10-2019-0105364, filed on 27 Aug. 2019, in Korea, the entire contents of which is hereby incorporated by reference in its entirety.

BACKGROUND

The present disclosure relates to a robot cleaner for recognizing a stuck situation through artificial intelligence (AI).

A robot cleaner is an AI device to self-drive in a cleaning area without an operation of a user to suction foreign substances, such as dust, from the floor, thereby automatically performing cleaning.

Such a robot cleaner sets a cleaning route by recognizing the structure of a space and performs a cleaning operation along the set cleaning route. In addition, the robot cleaner performs cleaning according to a preset schedule or a user command.

In general, such a robot cleaner detects distances to obstacles such as furniture or office supplies, walls, etc. in a cleaning area, maps the cleaning area according to the distances, and controls driving of left and right wheels to perform obstacle avoidance operation.

A conventional robot cleaner stores the location of a detected stuck area and recognizes and avoids the stuck area based on the stored location of the stuck area.

However, when the environment of the stuck area is changed, for example, when an obstacle is removed from the stuck area, the robot cleaner based on location recognition may determine a cleaning area as a stuck area.

Therefore, there is a need for ability to actively cope with change in environment of the stuck area.

SUMMARY

The present disclosure is to provide a robot cleaner capable of detecting change in surrounding environment and accurately determining a stuck situation.

The present disclosure is to provide a robot cleaner capable of continuously training a model for inferring a stuck situation through self-validation.

A robot cleaner according to an embodiment of the present disclosure may convert 3D image data and a bumper event into surrounding map image data, infer the stuck situation of the robot cleaner from the 3D image data and the bumper event using the stuck situation recognition model, and control driving of the robot cleaner according to an inference result.

A robot cleaner according to an embodiment of the present disclosure may determine whether an error is detected in the inference result of the stuck situation recognition model, re-labels training data according to determination, and continuously update the stuck situation recognition model.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIGS. 10 and 11 are views illustrating a process of determining a rotation angle when a robot cleaner recognizes a stuck situation according to an embodiment of the present disclosure.

FIG. 20 is a view illustrating a generated surrounding map using surrounding map data according to an embodiment of the present disclosure.

FIG. 21 is a view illustrating a process of determining a time point when a robot cleaner labels surrounding map data with a stuck situation according to an embodiment of the present disclosure.

FIG. 24 is a view illustrating a detailed method of self-validation.

DETAILED DESCRIPTION OF THE EMBODIMENTS

Figure 1:
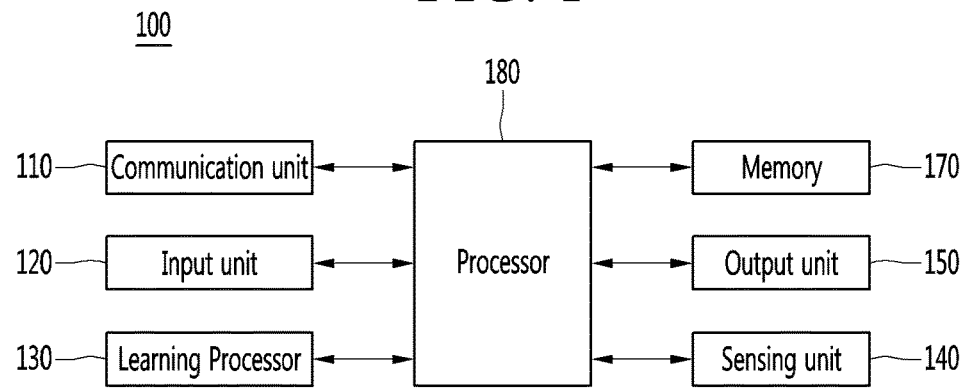
FIG. 1 illustrates an AI device 100 according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
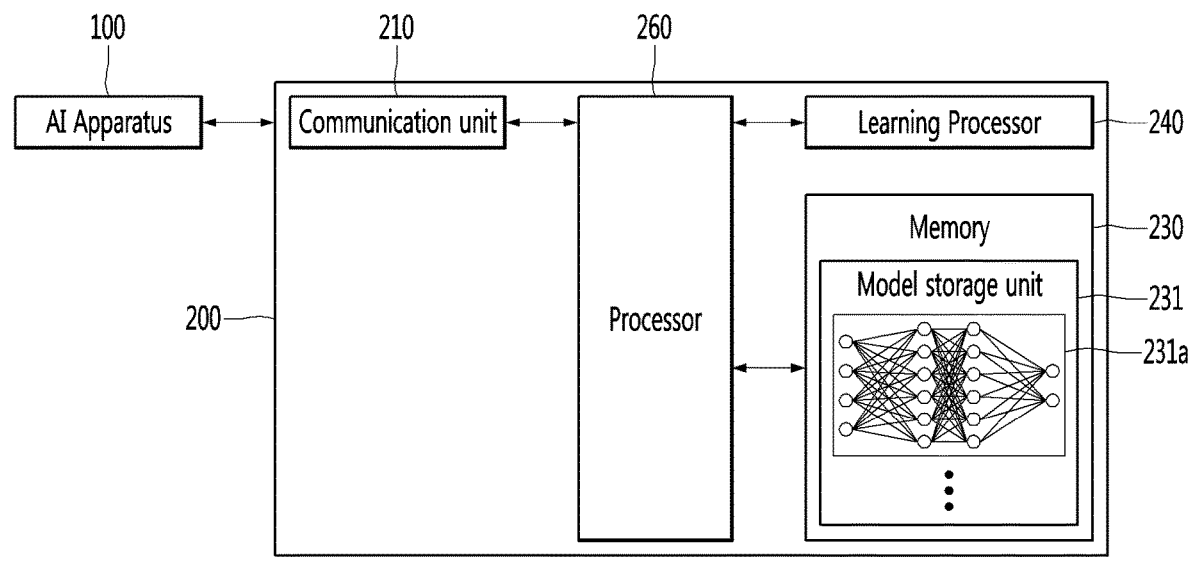
FIG. 2 illustrates an AI server 200 according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
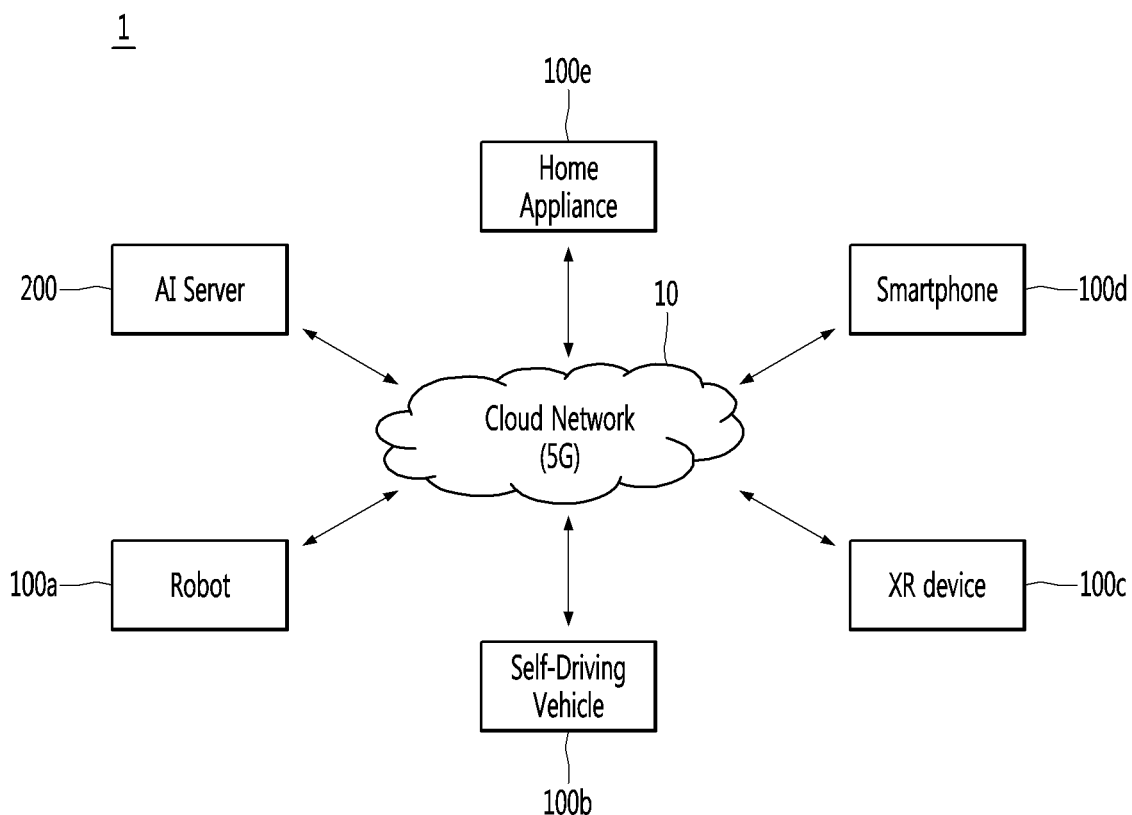
FIG. 3 illustrates an AI system 1 according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
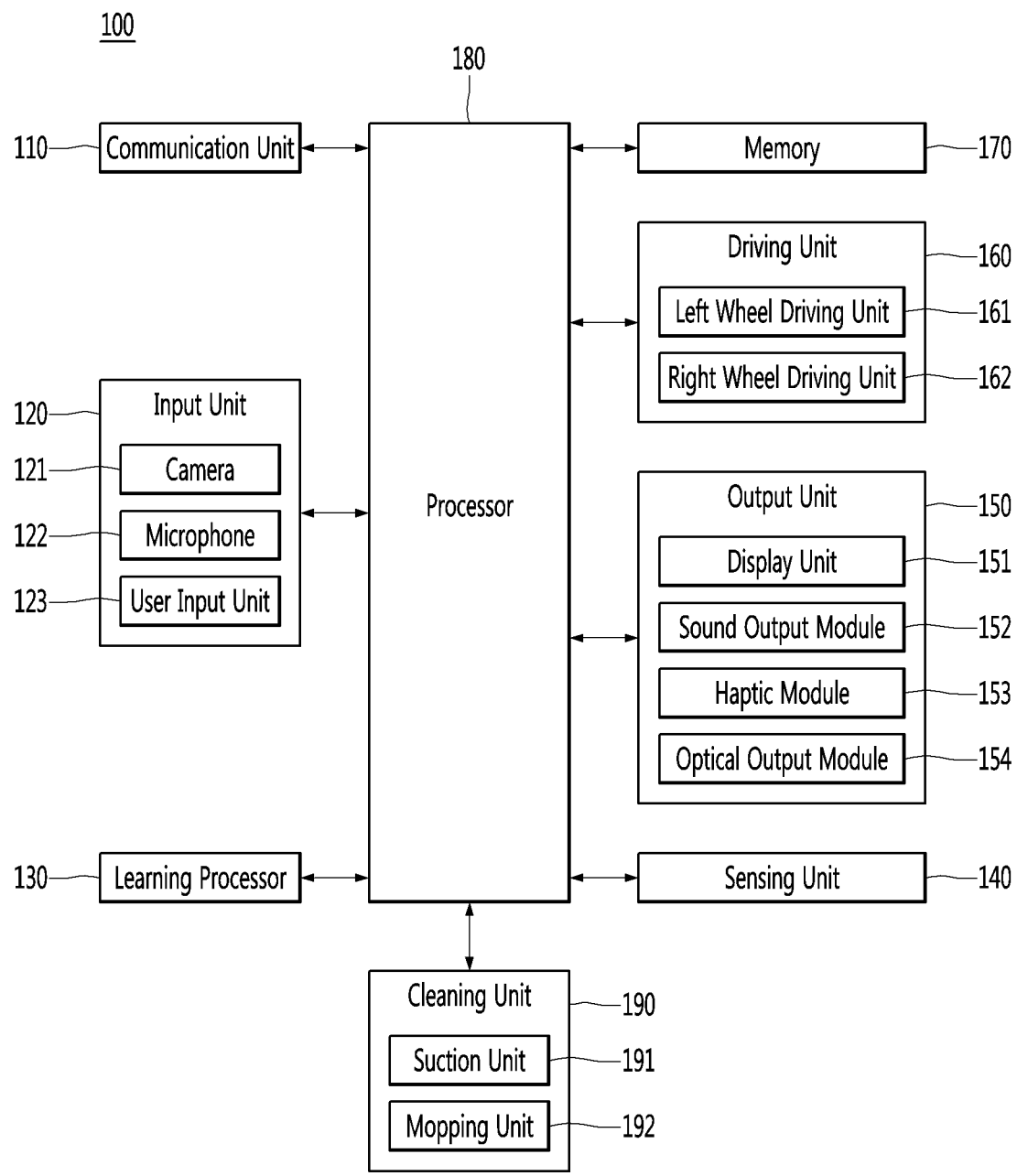
FIG. 4 illustrates an AI device 100 according to an embodiment of the present disclosure.

FIG. 4 illustrates an AI device 100 according to an embodiment of the present disclosure.

The redundant repeat of FIG. 1 will be omitted below.

Referring to FIG. 4, the AI device 100 may further include a driving unit 160 and a cleaning unit 190.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The sensing unit 140 may be called a sensor unit.

The sensing unit 140 may include at least one of a depth sensor (not illustrated) or an RGB sensor (not illustrated) to acquire image data for a surrounding of the AI robot 100.

The depth sensor may sense that light irradiated from the light emitting unit (not illustrated) is reflected and return. The depth sensor may measure the difference between times at which the returning light is transmitted, an amount of the returning light, and a distance from an object.

The depth sensor may acquire information on a two dimensional image or a three dimensional image of the surrounding of the AI robot 100, based on the distance from the object.

The RGB sensor may obtain information on a color image for an object or a user around the AI robot 100. The information on the color image may be an image obtained by photographing an object. The RGB sensor may be named an RGB camera.

In this case, the camera 121 may refer to the RGB sensor.

The output unit 150 may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The driving unit 160 may move the AI robot 100 in a specific direction or by a certain distance.

The driving unit 160 may include a left wheel driving unit 161 to drive the left wheel of the AI robot 100 and a right wheel driving unit 162 to drive the right wheel.

The left wheel driving unit 161 may include a motor for driving the left wheel, and the right wheel driving unit 162 may include a motor for driving the right wheel.

Although the driving unit 160 includes the left wheel driving unit 161 and the right wheel driving unit 162 by way of example as in FIG. 4, but the present disclosure is not limited thereto. In other words, according to an embodiment, the driving unit 160 may include only one wheel.

The cleaning unit 190 may include at least one of a suction unit 191 or a mopping unit 192 to clean the floor around the AI device 100.

The suction unit 191 may be referred to as a vacuum cleaning unit.

The suction unit 191 may suction air to suction foreign matters such as dust and garbage around the AI device 100.

In this case, the suction unit 191 may include a brush or the like to collect foreign matters.

The mopping unit 192 may wipe the floor in the state that a mop is at least partially in contact with the bottom surface of the AI device 100.

In this case, the mopping unit 192 may include a mop and a mop driving unit to move the mop.

In this case, the mopping unit 192 may adjust the distance from the ground surface through the mop driving unit. In other words, the mop driving unit may operate such that the mop makes contact with the ground surface when the mopping is necessary.

Figure 5:
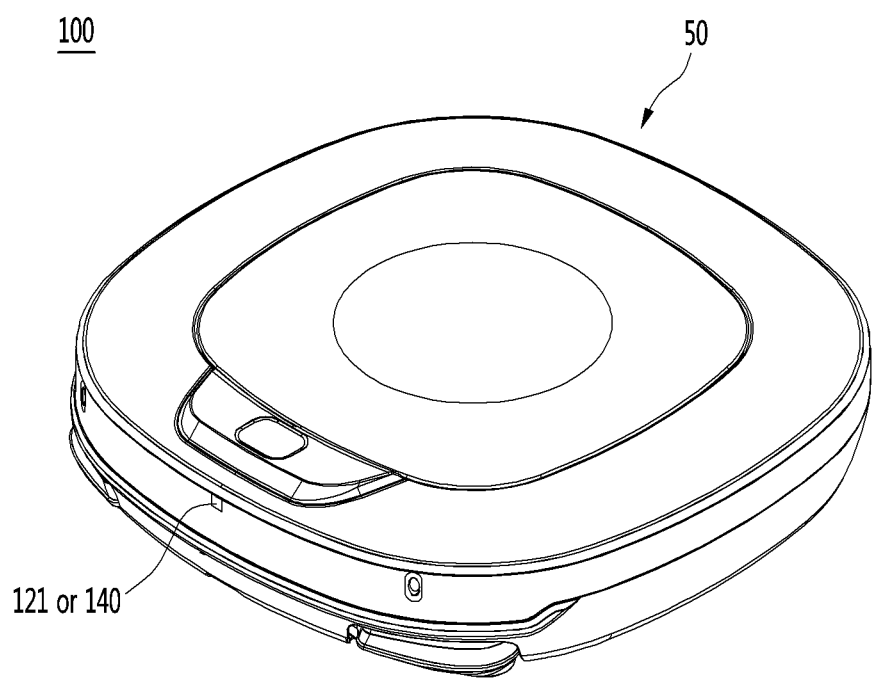
FIG. 5 a perspective view of an AI device 100 according to an embodiment of the present disclosure.

FIG. 5 a perspective view of the AI device 100 according to an embodiment of the present disclosure.

Referring to FIG. 5, the AI robot 100 may include a cleaner body 50 and a camera 121 or a sensing unit 140.

The camera 121 or the sensing unit 140 may irradiate a light forward and receive the reflected light.

The camera 121 or the sensing unit 140 may acquire the depth information using the difference between times at which the received lights are returned.

The cleaner body 50 may include remaining components except the camera 121 and the sensing unit 140 described with reference to FIG. 4.

Figure 6:
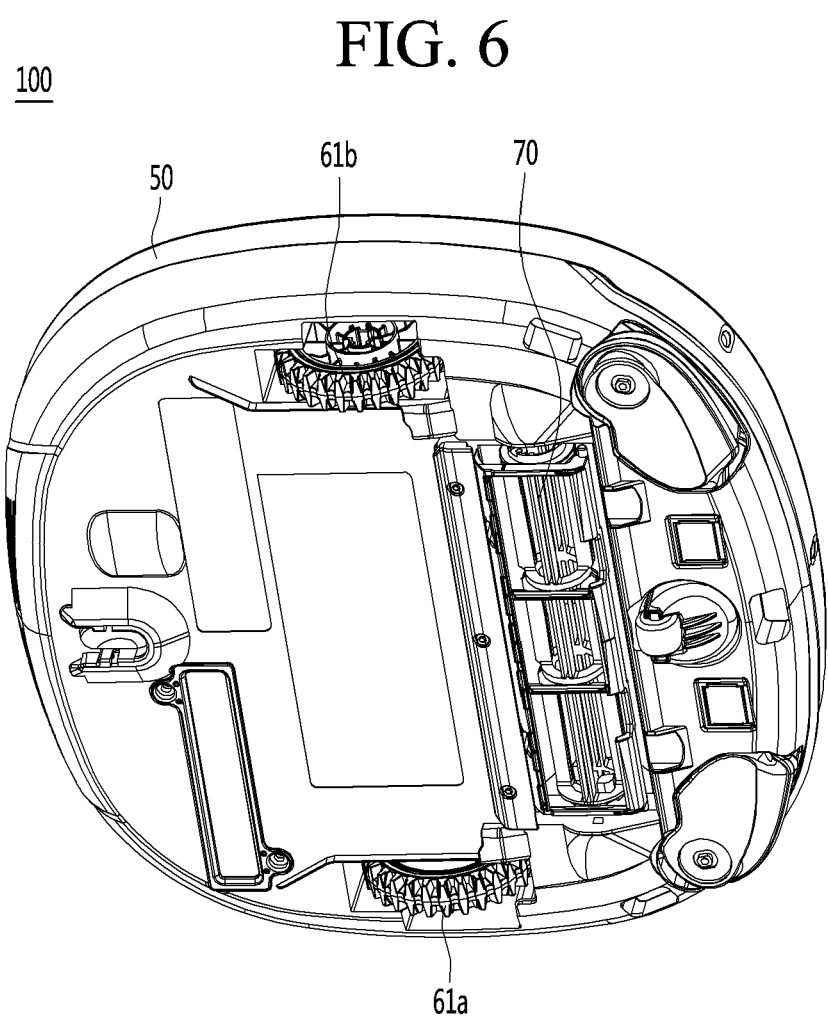
FIG. 6 a bottom view of an AI device 100 according to an embodiment of the present disclosure.

FIG. 6 is a bottom view of the AI device 100 according to an embodiment of the present disclosure.

Referring to 6, the AI device 100 may further include a cleaner body 50, a left wheel 61*a*, a right wheel 61*b*, and a suction unit 70 in addition to the components of FIG. 4.

The left wheel 61*a* and the right wheel 61*b* may allow the cleaner body 50 to travel.

The left wheel driving unit 161 may drive the left wheel 61*a* and the right wheel driving unit 162 may drive the right wheel 61*b*.

As the left wheel 61*a* and the right wheel 61*b* are rotated by the driving unit 160, the AI robot 100 may suction foreign matters such as dust and garbage through the suction unit 70.

The suction unit 70 is provided in the cleaner body 50 to suction dust on the floor surface.

The suction unit 70 may further include a filter (not illustrate) to collect foreign matters from the sucked air stream and a foreign matter receiver (not illustrated) to accumulate foreign matters collected through the filter.

In addition to the components of FIG. 4, the AI robot 100 may further include a mopping unit (not illustrated).

The mopping unit (not illustrated) may include a damp cloth (not illustrated) and a motor (not illustrated) to rotate the damp cloth in contact with the floor and to move the damp cloth along a set pattern.

The AI device 100 may wipe the floor with the mopping unit (not illustrated).

Figure 7A:
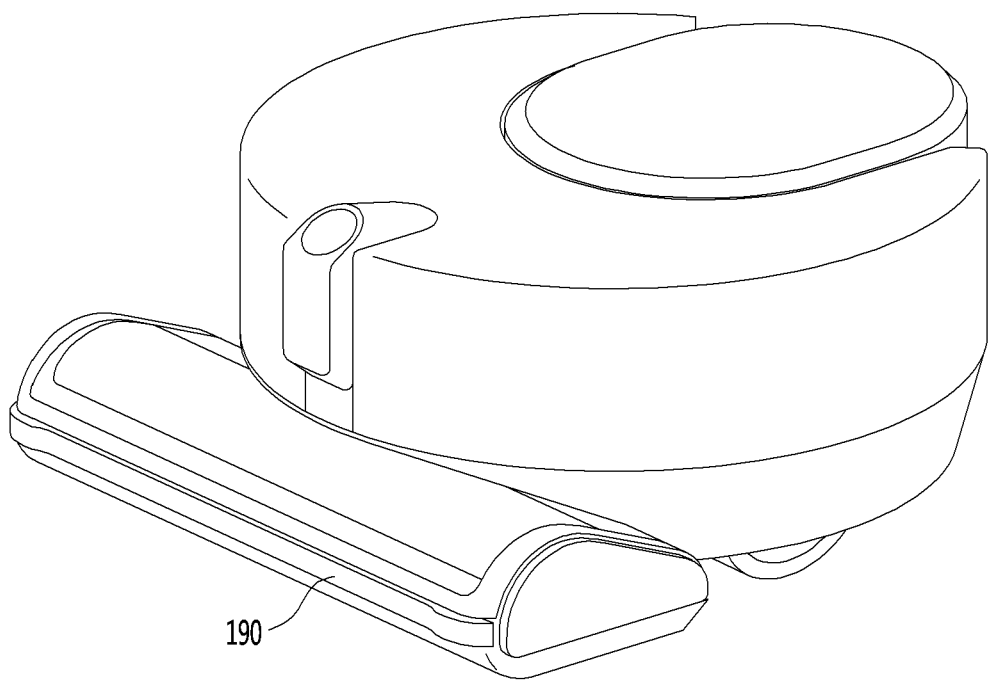
FIG. 7a is a side view of an artificial intelligence device according to another embodiment of the present disclosure.
Figure 7B:
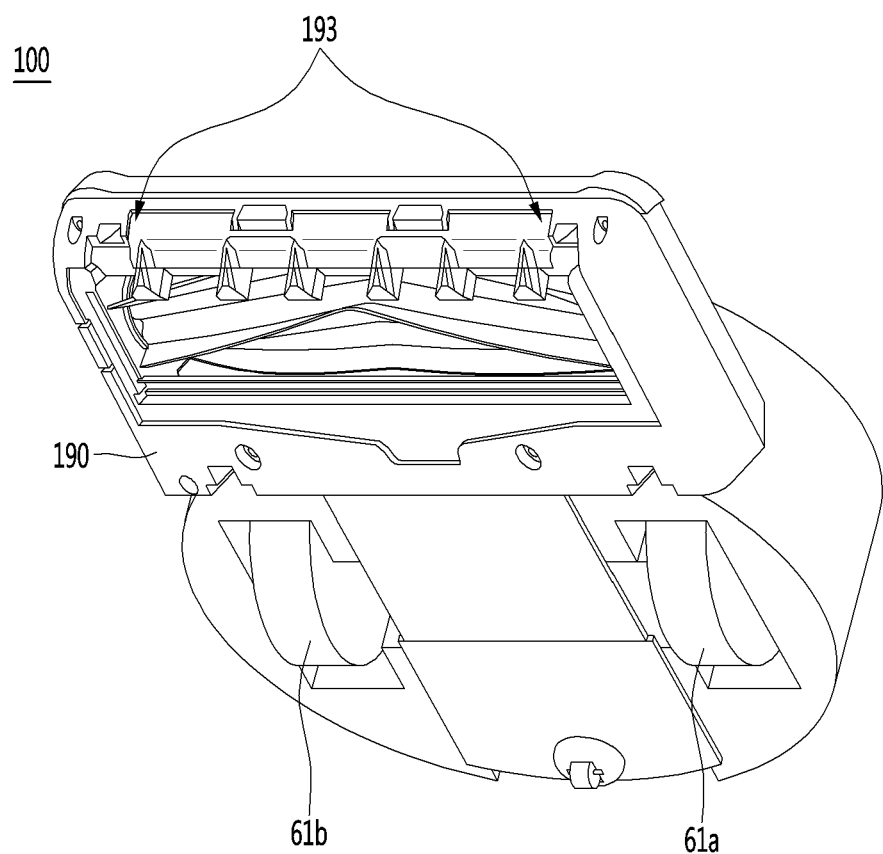
FIG. 7b is a bottom view of the artificial intelligence device.

FIG. 7*a* is a side view of an artificial intelligence device according to another embodiment of the present disclosure, and FIG. 7*b* is a bottom view of the artificial intelligence device.

Hereinafter, the artificial intelligence device 100 may be referred to as a robot cleaner.

Referring to FIGS. 7a and 7b, the robot cleaner 100 may further include a bumper 190 in addition to the components of FIG. 4.

The bumper 190 may be provided at the lower end of the main body of the robot cleaner 100. The bumper 190 may include a cleaning unit 190 including the suction unit 191 and the mopping unit 192 shown in FIG. 4.

The bumper 190 may mitigate impact applied to the main body due to collision with an obstacle or another object while the robot cleaner 100 travels.

The bumper 190 may include one or more bumper sensors (not shown). The bumper sensor may measure the amount of impact applied to the bumper 190.

The bumper sensor may generate a bumper event when a predetermined amount or more of impact is detected. The bumper event may be used to detect a stuck situation of the robot cleaner 100.

In addition, each of the left wheel 61a and the right wheel 61b may include a wheel sensor. The wheel sensor may be an optical sensor for measuring the amount of rotation of the left wheel or the right wheel. The amount of rotation of the left wheel or the right wheel measured through the wheel sensor may be used to calculate the movement distance of the robot cleaner 100.

One or more cliff sensors 193 may be provided at the lower surface of the bumper 190. The cliff sensor 193 measures a distance between the floor and the cliff sensor 193 using a transmitted infrared signal and a reflected infrared signal.

The processor 180 may determine that the robot cleaner 100 reaches a staircase or a cliff when the measured distance is equal to or greater than a certain distance or when the reflected infrared signal is not detected for a certain time.

Figure 8:
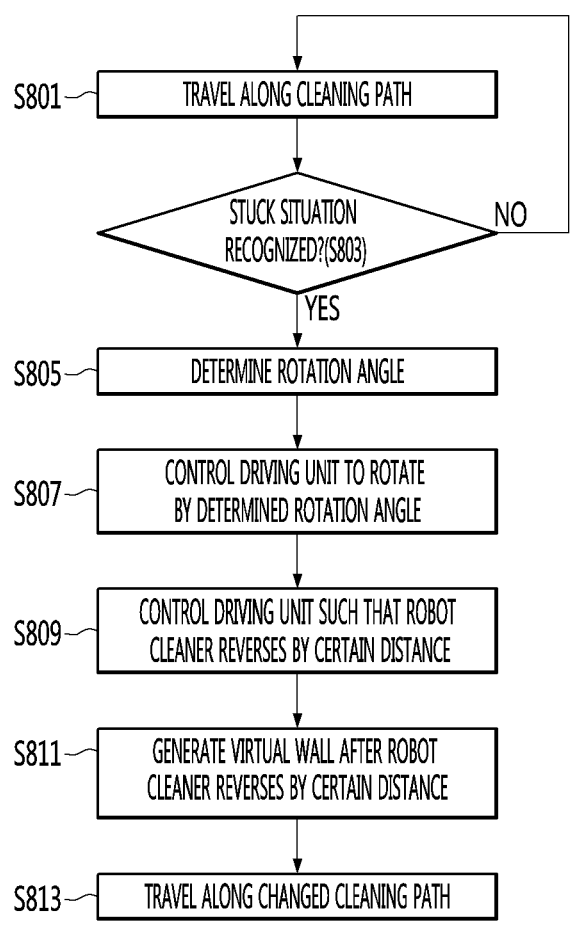
FIG. 8 is a flowchart illustrating a method of operating a robot cleaner for avoiding a stuck situation according to an embodiment of the present disclosure.

FIG. 8 is a flowchart illustrating a method of operating a robot cleaner for avoiding a stuck situation according to an embodiment of the present disclosure.

The processor 180 of the robot cleaner 100 controls the driving unit 160 such that the robot cleaner travels along a cleaning route (S801).

The processor 180 determines whether a stuck situation is recognized while the robot cleaner travels (S803).

In one embodiment, the processor 180 may recognize the stuck situation through the bumper sensor (not shown) provided in the bumper 190.

The stuck situation may refer to a situation in which the robot cleaner 100 is stuck by an obstacle.

When the number of bumper events measured through the bumper sensor is equal to or greater than a predetermined number during a predetermined time, the processor 180 may determine that the robot cleaner 100 is in the stuck situation.

When the amount of impact applied to the bumper is equal to or greater than a predetermined amount of impact, the bumper sensor may generate the bumper event. The processor 180 may recognize the stuck situation based on the number of generated bumper events.

Upon determining that the stuck situation is recognized, the processor 180 determines a rotation angle of the robot cleaner 100 (S805).

When the stuck situation of the robot cleaner 100 is recognized, the processor 180 may determine the rotation angle of the robot cleaner 100, in order to avoid the robot cleaner 100 from the stuck situation.

The processor 180 may determine the rotation angle to avoid the stuck situation based on traveling angles and traveling speeds at time points before the stuck situation is recognized.

The processor 180 may determine the rotation angle to avoid the stuck situation, based on a plurality of traveling angles and a plurality of traveling speeds measured at a plurality of unit time intervals before the stuck situation is recognized.

A process of determining the rotation angle of the robot cleaner 100 when the stuck situation is recognized will be described below in detail.

The processor 180 controls the driving unit 160 such that the robot cleaner rotates by the determined rotation angle (S807).

The processor 180 may control operation of the left wheel driving unit 161 and the right wheel driving unit 162 such that the robot cleaner rotates by the determined rotation angle.

The processor 180 may rotate the left wheel 61a and the right wheel 61b such that the robot cleaner rotates by the determined rotation angle.

The processor 180 may control operation of a left wheel motor for controlling the left wheel 61a and a right wheel motor for controlling the right wheel 61b such that the robot cleaner 100 rotates by the determined rotation angle.

The processor 180 may control the driving unit 160 such that the robot cleaner reversely rotates by the determined rotation angle, in order to reverse in a direction before recognizing the stuck situation.

Thereafter, the processor 180 controls the driving unit 160 such that the robot cleaner reverses by a certain distance (S809).

The processor 180 may control the driving unit 160 such that the robot cleaner 100 moves backward by the certain distance after rotating by the determined rotation angle.

The robot cleaner 100 reverses by the certain distance in order to deviate from the stuck situation to avoid an obstacle.

The processor 180 generates a virtual wall at a front position of the robot cleaner 100 (S811), after reversing the robot cleaner 100 by the certain distance.

The virtual wall may be a virtual wall on a cleaning map used to prevent the robot cleaner 100 from re-entering in the future. The virtual wall is not invisible to the human eyes and visible only in the field of view of the robot cleaner 100.

The processor 180 may acquire the front position of the robot cleaner 100 and insert the virtual wall at the acquired front position, after the robot cleaner 100 reverses by the certain distance.

Thereafter, the processor 180 controls the driving unit 160 such that the robot cleaner travels along the changed cleaning route (S813).

In one embodiment, the changed cleaning route may be a route excluding a route included in an area, in which the stuck situation is recognized, from a predetermined cleaning route.

That is, the processor 180 may change an existing cleaning route to a new cleaning route, in order to prevent the robot cleaner 100 from being in the stuck situation.

According to the embodiment of the present disclosure, the robot cleaner 100 may automatically recognize the stuck situation and rapidly avoid the stuck situation. Therefore, it is possible to decrease power consumption of the robot cleaner 100 and to increase cleaning performance.

FIGS. 9a to 9e are views illustrating a process of recognizing and avoiding a stuck situation at a robot cleaner according to an embodiment of the present disclosure.

Referring to FIGS. 9a to 9e, a cleaning map 900 created by simultaneous localization and mapping (SLAM) is shown.

A cleaning route 910 of a robot cleaner identifier 901 for identifying the robot cleaner 100 on the cleaning map 900 is shown on the cleaning map 900.

Figure 9A:
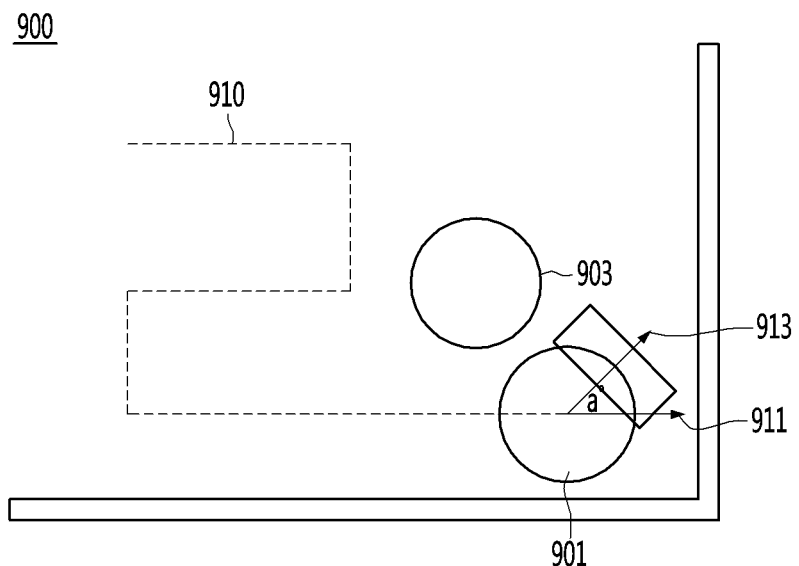
FIGS. 9a to 9e are views illustrating a process of recognizing and avoiding a stuck situation at a robot cleaner according to an embodiment of the present disclosure.

FIG. 9*a* shows recognition of the stuck situation by an obstacle 903 while the robot cleaner 100 travels along the cleaning route 910.

The processor 180 may recognize the stuck situation using the bumper sensor provided in the bumper 190 of the robot cleaner 100.

When the number of bumper events detected through the bumper sensor is equal to or greater than the predetermined number during the predetermined time, the processor 180 may recognize that the robot cleaner 100 is in the stuck situation.

The processor 180 may determine the rotation angle (a degrees) of the robot cleaner 100 when the stuck situation is recognized.

The processor 180 may determine an angle between a first traveling direction 911 before the stuck situation is recognized and a second traveling direction 913 when the stuck situation is recognized as the rotation angle. The method of determining the rotation angle will be described below in detail.

Figure 9B:
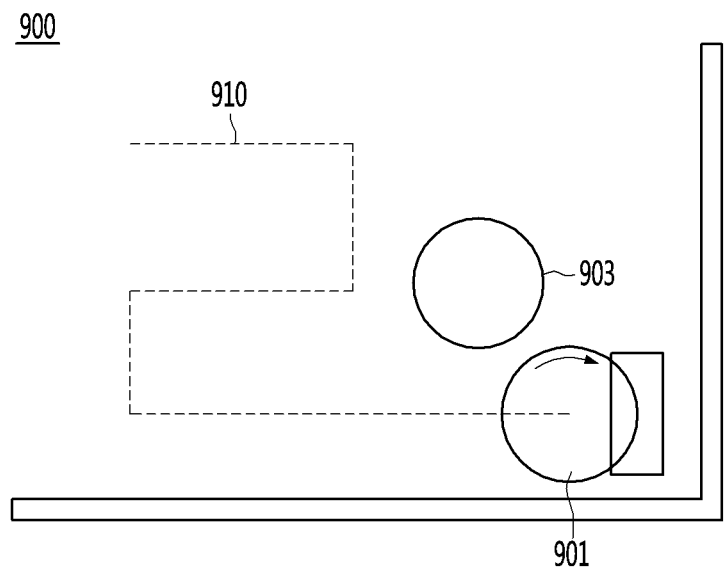

The processor 180 may rotate the robot cleaner 100 by the determined rotation angle (a degrees). Referring to FIG. 9*b*, the robot cleaner identifier 901 rotates by the determined rotation angle (a degrees) in a direction before the stuck situation is recognized.

Figure 9C:
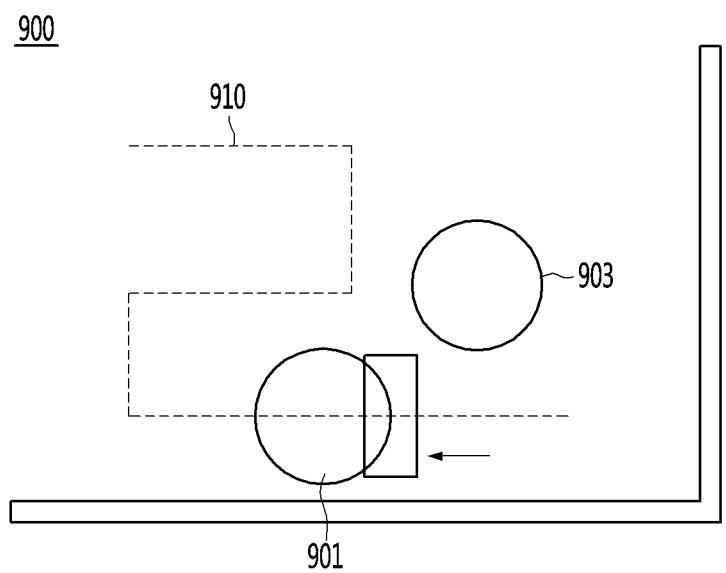

Thereafter, the processor 180 may control the driving unit 160 to reverse the robot cleaner 100 by the certain distance. Referring to FIG. 9*c*, the robot cleaner identifier 901 reverses by the certain distance.

Here, the certain distance may be a distance at which the robot cleaner deviates from an obstacle.

Figure 9D:
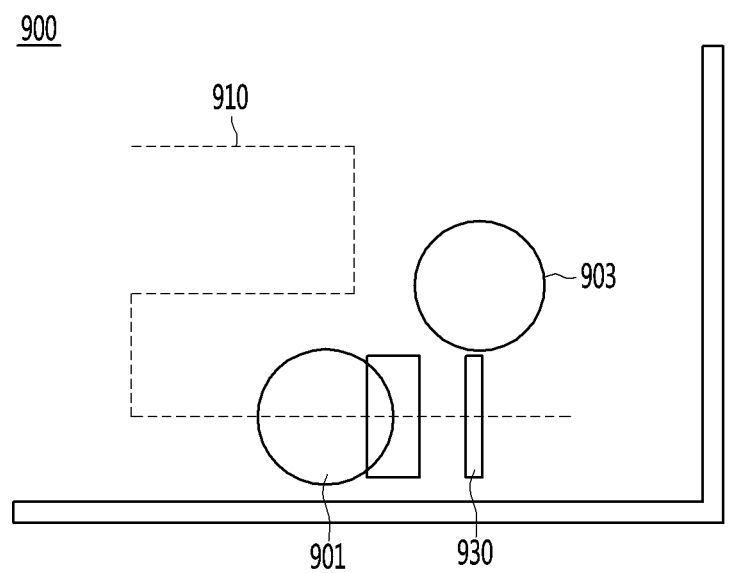

After the robot cleaner 100 reverses by the certain distance, the processor 180 may insert a virtual wall 930 on the cleaning map 900, as shown in FIG. 9*d*. The processor 180 may insert the virtual wall 930 at the front position of the robot cleaner 100 on the cleaning map 900, after reversing the robot cleaner 100 by the certain distance.

In another example, the processor 180 may insert the virtual wall 930 into an area including a line connecting the center of the obstacle 903 and the traveling route of the robot cleaner 100, after reversing the robot cleaner 100 by the certain distance.

The virtual wall 930 may be inserted in order to prevent the robot cleaner 100 from being in the stuck situation in the future.

It is possible to prevent the entry route of the robot cleaner 100 from being blocked due to the virtual wall 930 reflected on the cleaning map 900, thereby preventing the robot cleaner 100 from being in the stuck situation in the future.

Meanwhile, the processor 180 may drive the robot cleaner 100 along the new traveling route after reflecting the virtual wall 930 on the cleaning map 900.

Figure 9E:
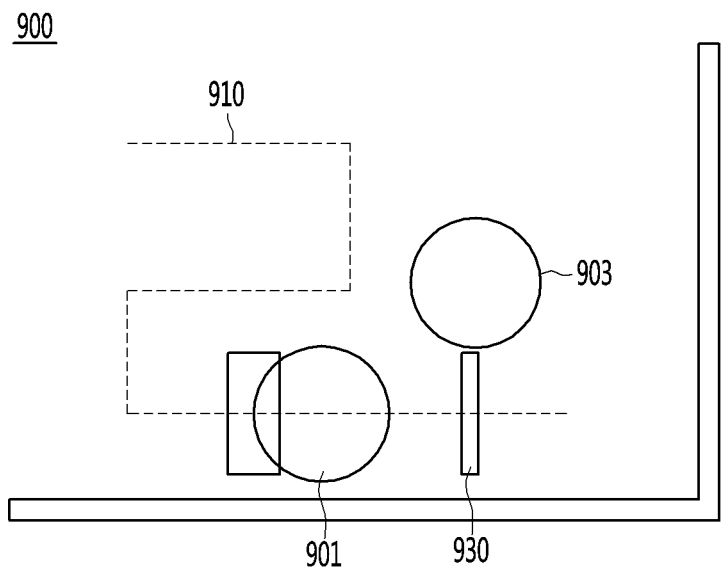

That is, as shown in FIG. 9*e*, the robot cleaner identifier 901 may travel in the opposite direction of the virtual wall 930.

Next, a process of determining the rotation angle in order to avoid the stuck situation when the robot cleaner recognizes the stuck situation will be described.

Figure 10:
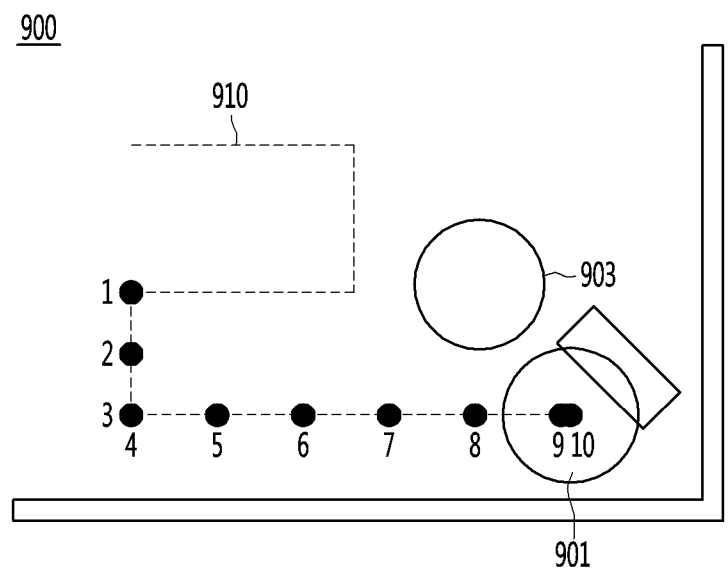

FIGS. 10 and 11 are views illustrating a process of determining a rotation angle when a robot cleaner recognizes a stuck situation according to an embodiment of the present disclosure.

Referring to FIG. 11, a first graph 1110 indicating the traveling angle of the robot cleaner 100 over time and a second graph 1130 indicating the traveling speed of the robot cleaner 100 over time are shown.

The robot cleaner 100 may measure the traveling angle and traveling speed of the robot cleaner 100 per unit time. The robot cleaner 100 may measure the traveling angle using a reference point and the rotation direction of the left wheel or the right wheel. The reference point may be a point of a ceiling or a point of the floor, but this is merely an example.

The robot cleaner 100 may measure the traveling speed of the robot cleaner 100 using the amount of rotation of the left wheel or the right wheel measured through the wheel sensor per unit time.

The unit time may be one second but this is merely an example.

Referring to FIG. 10, assume that the stuck situation of the robot cleaner 100 is recognized at a tenth time point t10 among first time point t1 to tenth time point t10 while the robot cleaner identifier 901 travels along the traveling route 910 on the cleaning map 900.

The processor 180 may acquire the traveling angle (the current traveling angle) of the robot cleaner 100 at the tenth time point t10 when the stuck situation is recognized.

At the same time, the processor 180 may acquire the traveling angles of past time points before the tenth time point t10.

The processor 180 may calculate the rotation angle to avoid the stuck situation using the current traveling angle and an average value of the traveling angles of the past time points.

The processor 180 may calculate the rotation angles as shown in Equation 1 below.

$$\theta_{diff} = \theta_n - \frac{1}{N}\sum_{k=1}^{N}\theta_{n-k} \quad \text{[Equation 1]}$$

That is, the rotation angle θdiff may be obtained by subtracting the average angle of traveling angles θn-k measured at the past N time points from the current traveling angle θ.

Here, N may be 5, but this is merely an example.

However, at each of the sampled N time points, the traveling speed of the robot cleaner 100 should be equal to or greater than a threshold speed.

The reason why the traveling speed of the robot cleaner 100 is equal to or greater than the threshold speed at the sampled past time point is because, when the traveling speed of the robot cleaner 100 is less than the threshold speed, the robot cleaner 100 is already in the stuck situation or stays at a fixed position and thus it is difficult to use the rotation angles at the time points to determine the rotation angle for avoidance.

For example, when the number of sampled time points is 5, the fifth time point t5 to the ninth time point t9 before the tenth time point t10 in which the stuck situation is recognized are checked.

Referring to the second graph 1130, the traveling speeds of the robot cleaner 100 from the fifth time point t5 to the eighth time point t8 are equal to or greater than the threshold speed, but the traveling speed at the ninth time point t9 is less than the threshold speed.

Accordingly, the ninth time point t9 is not used as a time point used to calculate the rotation angle.

Since the traveling speed of the robot cleaner 100 is less than the threshold speed even at the third time point t3 and the fourth time point t4, the third time point t3 and the fourth time point t4 are not used as samples for calculating the rotation angle.

As a result, since the traveling speed at the second time point is equal to or greater than the threshold speed, the processor 180 may determine the traveling angles at the second time point t2 and the fifth time point t5 to the eighth time point t8 as a sampling target.

The processor 180 may determine a value obtained by subtracting the average angle of the traveling angles at the second time point t2 and the fifth time point t5 to the eighth time point t8 from the current traveling angle, as the rotation angle.

The processor 180 may control the driving unit 160 to reversely rotate the robot cleaner by the determined rotation angle.

For example, when the current traveling angle is 45 degrees and the average angle of the traveling angles at the sampled time points is 0 degrees, the processor 180 may control the driving unit 160 to reversely rotate the robot cleaner 100 by 45 degrees (45-0).

According to the embodiment of the present disclosure, when the stuck situation of the robot cleaner 100 is detected, it is possible to change the rotation angle of the robot cleaner 100 to rapidly avoid the stuck situation.

Therefore, it is possible to prevent unnecessary waste of power of the robot cleaner 100 and to greatly improve the ability to cope with the stuck situation.

Figure 12:
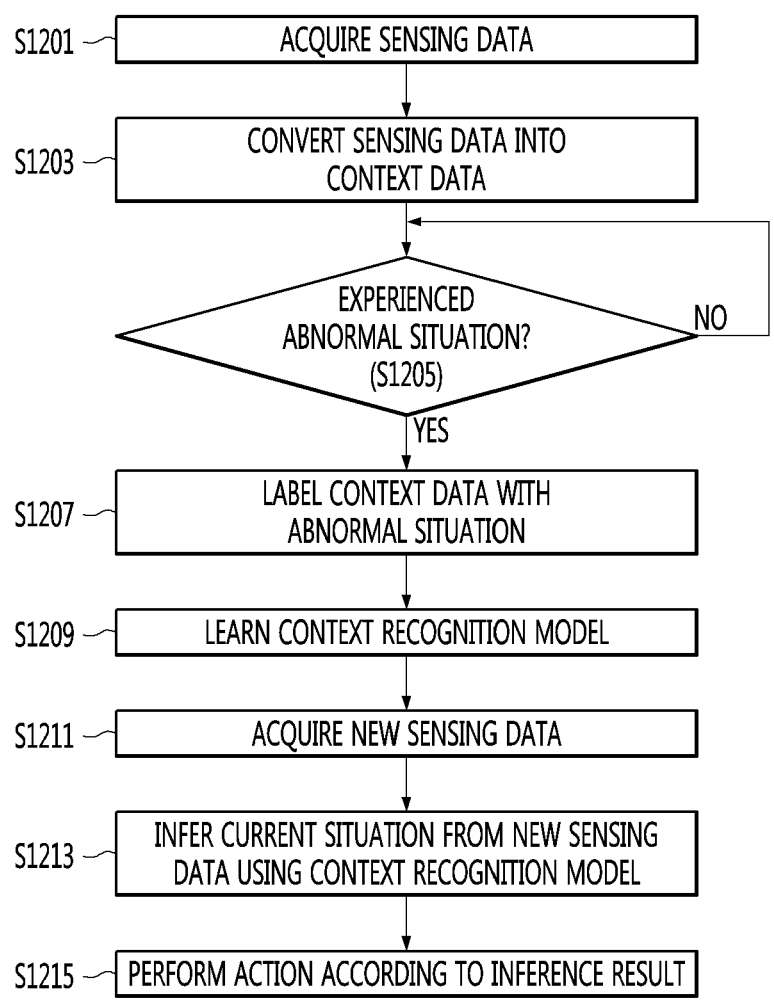
FIG. 12 is a view illustrating a method of operating an artificial intelligence device according to an embodiment of the present disclosure.

FIG. 12 is a view illustrating a method of operating an artificial intelligence device according to an embodiment of the present disclosure.

In particular, FIG. 12 relates to a method of recognizing a situation through self-training at the artificial intelligence device 100.

Referring to FIG. 12, the processor 180 of the artificial intelligence device 100 acquires sensing data through the sensing unit 140 (S1201).

The processor 180 converts the acquired sensing data into context data (S1203).

In one embodiment, the context data may indicate a surrounding situation related to the artificial intelligence device 100. That is, the context data may be used to determine the surrounding situation of the artificial intelligence device 100.

The surrounding situation of the artificial intelligence device 100 may be any one of a normal situation or an abnormal situation.

The abnormal situation may refer to a situation in which operation of the artificial intelligence device 100 is not normally performed and the normal situation may refer to a situation in which operation of the artificial intelligence device 100 is normally performed.

This will be described with reference to FIG. 13.

Figure 13:
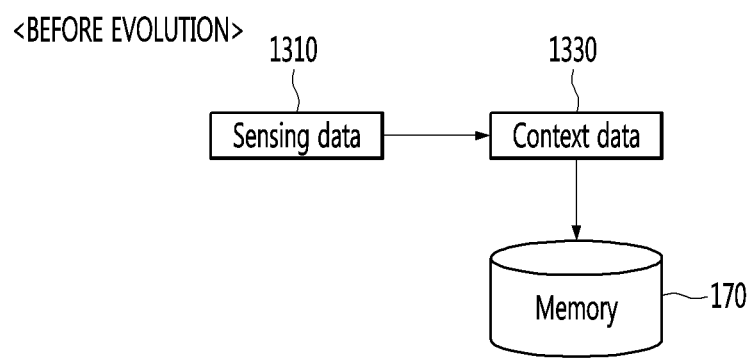
FIG. 13 is a view illustrating operation performed by an artificial intelligence device before evolution according to an embodiment of the present disclosure.

FIG. 13 is a view illustrating operation performed by an artificial intelligence device before evolution according to an embodiment of the present disclosure.

In FIG. 13, since a context recognition model is not trained, the artificial intelligence device 100 may not be evolved yet.

Referring to FIG. 13, the sensing unit 140 of the artificial intelligence device 100 may collect sensing data 1310.

The processor 180 of the artificial intelligence device 100 may convert the collected sensing data 1310 into context data 1330.

The converted context data 1330 may be stored in the memory 170.

FIG. 12 will be described again.

The processor 180 determines whether the artificial intelligence device 100 has experienced the abnormal situation based on the converted context data (S1205).

Upon determining that the artificial intelligence device 100 has experienced the abnormal situation, the processor 180 labels the converted context situation with the abnormal situation (S1207).

That is, the context data may be labeled with the abnormal situation, and the context data and the labeling data labeled therewith may be used for training of the context recognition model.

That is, the context data and the abnormal situation may configure a training data set.

The processor 180 learns the context recognition model based on the context data and the labeling data (S1209).

The context recognition model may be an artificial neural network based model subjected to supervised learning using a deep learning algorithm or a machine learning algorithm.

Here, as the artificial neural network of the context recognition model, any one of support vector machine (SVM) or a convolutional neural network (CNN) may be used.

The processor 180 or the learning processor 130 may perform supervised learning with respect to the context recognition model based on the context data and the labeling data configuring the training data set.

The context recognition model may be trained with the aim of accurately inferring the labeled abnormal or normal situation from given context data.

The process of training the context recognition model will be described with reference to the following drawings.

Figure 14:
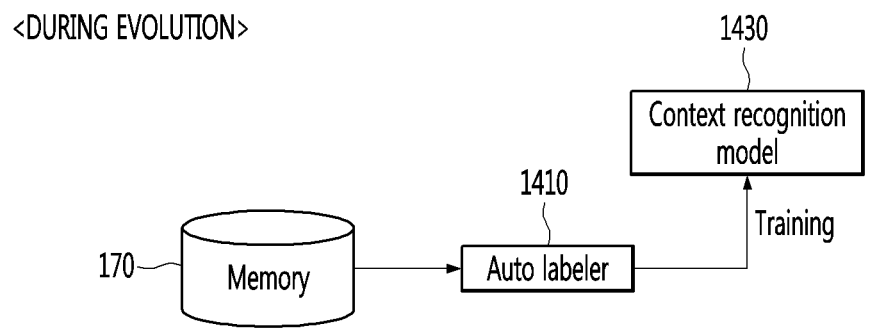
FIGS. 14 and 15 are views illustrating a training process performed during evolution of an artificial intelligence device according to an embodiment of the present disclosure.
Figure 15:
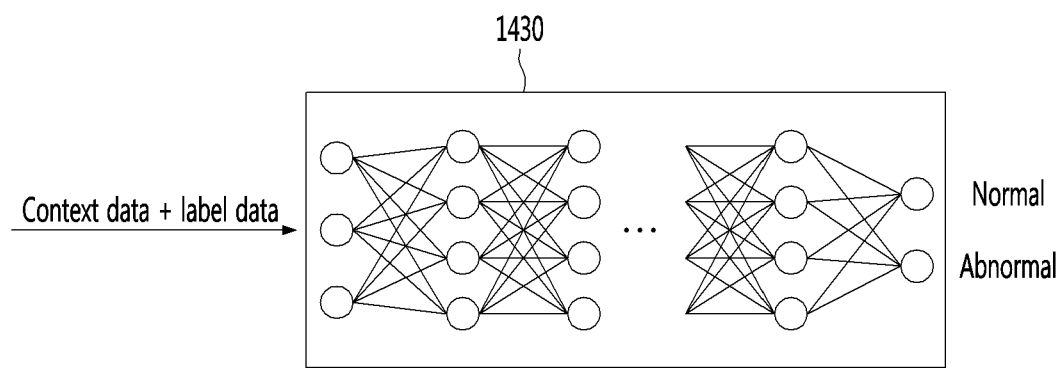

FIGS. 14 and 15 are views illustrating a training process performed during evolution of an artificial intelligence device according to an embodiment of the present disclosure.

In FIGS. 14 and 15, since the context recognition model 1430 is trained to autonomously grasp the context, the artificial intelligence device 100 may be being evolved.

Referring to FIG. 14, an auto labeler 1410 may label the context data stored in the memory 170. The auto labeler 1410 may be included in any one of the processor 180 or the learning processor 130.

The auto labeler 1410 may label the context data with the abnormal situation when the abnormal situation of the artificial intelligence device 100 is detected.

The context data and the abnormal situation labeled therewith may configure a training data set and may be used for supervised learning of the context recognition model 1430.

Referring to FIG. 15, the context recognition model 1430 including an artificial neural network is shown.

The context recognition model 1430 may be subjected to supervised learning using context data and labeling data.

The processor 180 or the learning processor 130 may extract an input feature vector from the context data. The extracted input feature vector may be input to the context recognition model 1430.

The processor 180 or the learning processor 130 may be trained to minimize a cost function indicating a difference between a target feature vector (or a target feature point) which is an inference result of the context recognition model 1430 and a current situation which is labeling data.

The cost function of the context recognition model 1430 may be expressed by a squared mean of a difference between a label for an operation situation of the artificial intelligence device 100 corresponding to training data and an operation situation inferred from each training data.

In the context recognition model 1430, model parameters included in the artificial neural network may be determined to minimize the cost function through training.

The target feature point of the context recognition model 1430 may include an output layer of a single node indicating the normal or abnormal situation of the artificial intelligence device 100. The target feature point may have a value of 1 when the target feature point indicates the normal situation and have a value of 0 when the target feature point indicates the abnormal situation. In this case, the output layer of the context recognition model 1430 may use sigmoid, hyperbolic tangent, etc. as an activation function.

In another example, the target feature point of the context recognition model 1430 may include output layers of two output nodes indicating the normal or abnormal situation of the artificial intelligence device 100.

That is, the target feature point (target feature vector) may include a normal situation and an abnormal situation, may have a value "(1, 0)" when the target feature point indicates the normal situation, and have a value "(0, 1)" when the target feature point indicates the abnormal situation. In this case, the output layer of the context recognition model 1430 may use Softmax as an activation function.

FIG. 12 will be described again.

Thereafter, the processor 180 acquires new sensing data (S1211), and infers whether a current situation is a normal situation or an abnormal situation from the acquired new sensing data using the trained context recognition model (S1213).

The processor 180 performs action according to an inference result (S1215).

The processor 180 may control one or more components configuring the artificial intelligence device 100 to perform operation corresponding to the normal situation, when the inference result is a normal situation.

The processor 180 may control one or more components configuring the artificial intelligence device 100 to perform operation corresponding to the abnormal situation, when the inference result is an abnormal situation.

Figure 16:
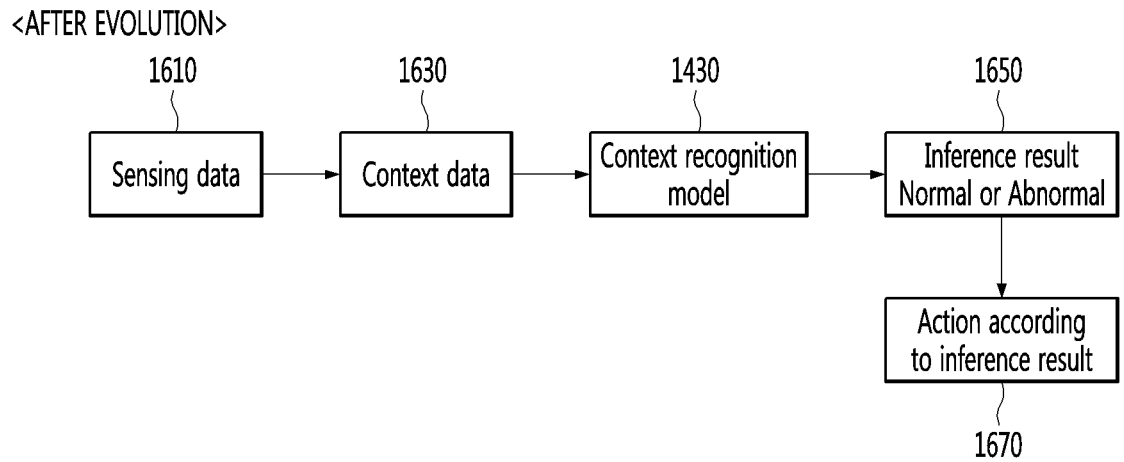
FIG. 16 is a view illustrating a process performed after evolution of an artificial intelligence device according to an embodiment of the present disclosure.

FIG. 16 is a view illustrating a process performed after evolution of an artificial intelligence device according to an embodiment of the present disclosure.

In FIG. 16, the artificial intelligence device 100 may determine whether a current situation is a normal situation or an abnormal situation using the context recognition model 1430 in a state in which training of the context recognition model 1430 is completed.

Referring to FIG. 16, the artificial intelligence device 100 may acquire sensing data 1610 through the sensing unit 140. The artificial intelligence device 100 may convert the acquired sensing data into context data.

The artificial intelligence device 100 may output an inference result 1650 indicating that the current situation is a normal situation or an abnormal situation from the context data using the context recognition model 1430.

The artificial intelligence device 100 may perform an action 1670 according to the inference result 1650.

Meanwhile, the artificial intelligence device 100 may perform error detection and self-validation with respect to the inference result. The artificial intelligence device 100 may continuously train the context recognition model 1430 through error detection and self-validation.

This will be described with reference to FIGS. 17 and 18.

Figures 17, 18:
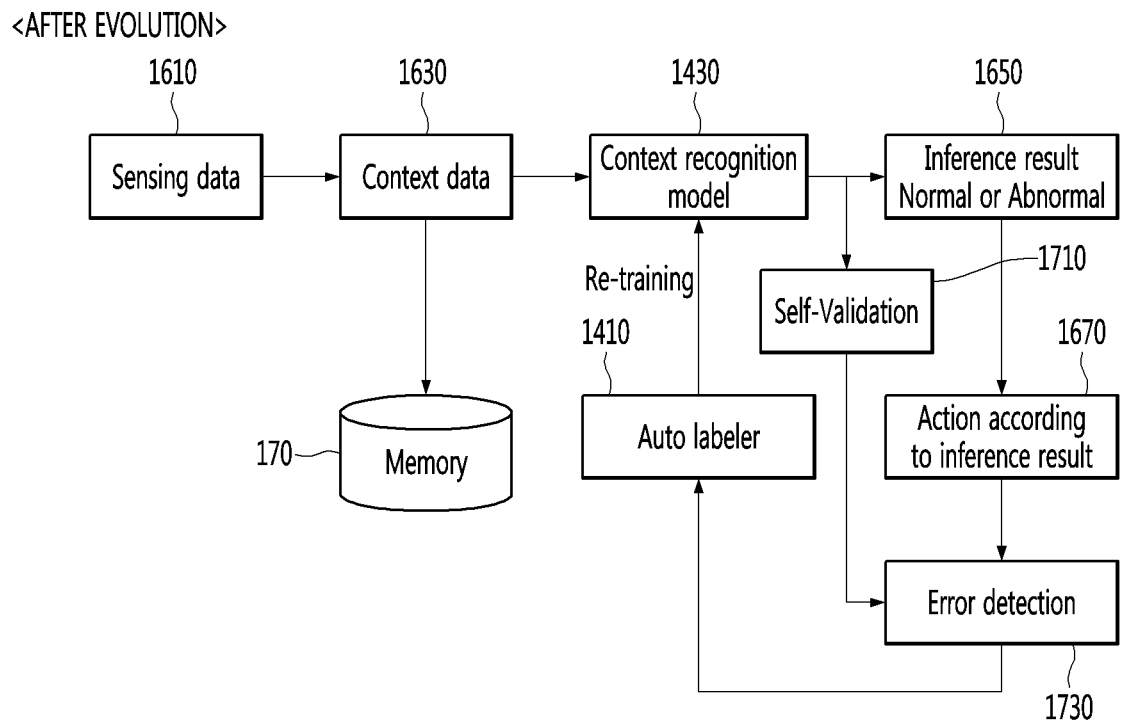
FIG. 17 is a view illustrating a process of continuously training a context recognition model through error detection and self-validation at an artificial intelligence device according to an embodiment of the present disclosure.
FIG. 18 is a view illustrating a detailed process of self-validation.

FIG. 17 is a view illustrating a process of continuously training a context recognition model through error detection and self-validation at an artificial intelligence device according to an embodiment of the present disclosure, and FIG. 18 is a view illustrating a detailed process of self-validation.

Referring to FIG. 17, the artificial intelligence device 100 may perform action 1670 according to the inference result 1650 and perform error correction 1730 for determining whether an error is detected with respect to the performed action 1670.

Error detection 1730 may be included in self-validation 1710.

The artificial intelligence device 100 may re-label the context data 1630 through the auto labeler 1410 when an error is detected with respect to the inference result.

For example, the artificial intelligence device 100 performed an existing action because the inference result is a normal situation, but an actual situation may be detected as an abnormal situation.

The artificial intelligence device 100 may label the context data 1630 with the abnormal situation to re-train the context recognition model 1430.

The artificial intelligence device 100 performs an existing action performed before inference, when the inference result is a normal situation. Thereafter, the artificial intelligence device 100 may determine whether there is an error in determination of the normal situation.

That is, the artificial intelligence device 100 may not take further action when the error is not detected in the determined situation while the existing action is performed, after determining the normal situation.

The artificial intelligence device 100 may determine that an error occurs in determination of the normal situation, after determining the normal situation. That is, even though the artificial intelligence device 100 determines the normal situation, the abnormal situation may be detected when performing the existing situation. In this case, the artificial intelligence device 100 may re-label the context data used to determinate the normal situation with the abnormal situation and re-train the context recognition model 1430.

Meanwhile, the artificial intelligence device 100 may perform the existing action as before the determination of the abnormal situation even upon determining that the inference result is an abnormal situation. The artificial intelligence device 100 may periodically perform the existing action as before the determination of the abnormal situation, even upon determining that the inference result is an abnormal situation.

The artificial intelligence device 100 may determine that an error is detected when a normal situation is detected while the existing action is performed under the abnormal situation. In this case, the artificial intelligence device 100 may re-label the context data used to determine the abnormal situation with the normal situation and re-train the context recognition model 1430.

The artificial intelligence device 100 may determine that an error is not detected and correct inference is performed when the abnormal situation is detected again while the existing action is performed under the abnormal situation. In this case, the artificial intelligence device 100 may perform an action suitable for the abnormal situation.

According to the embodiment of the present disclosure, it is possible to perform self-validation with respect to the inference result of the context recognition model 1430 and to evolve the model in real time as re-training is performed.

Therefore, it is possible to improve the ability of the artificial intelligence device 100 to actively cope with the changed surrounding environment without user intervention.

Hereinafter, the embodiment of the present disclosure will be described in greater detail on the assumption that the artificial intelligence device 100 is a robot cleaner.

Figure 19:
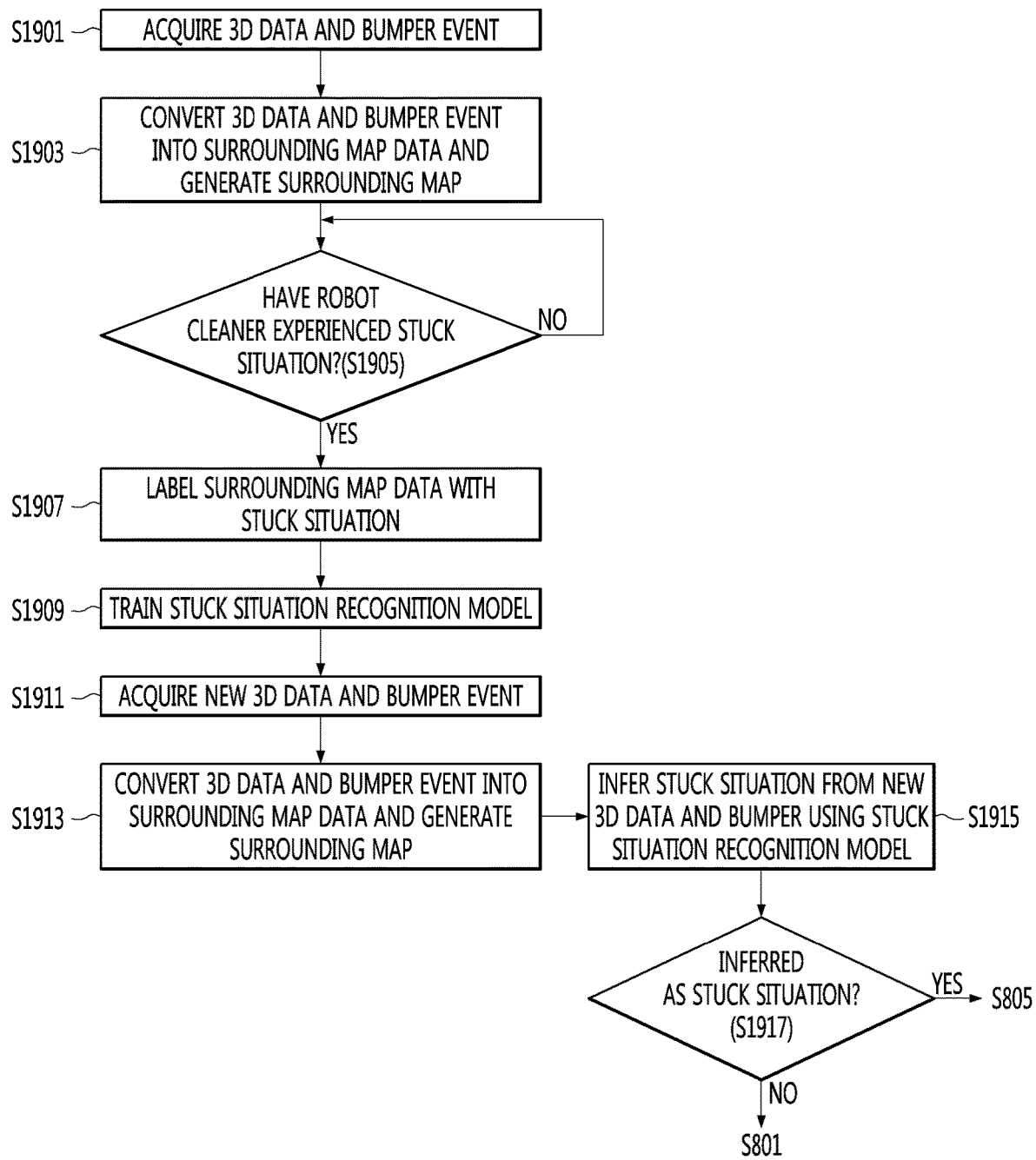
FIG. 19 is a view illustrating a method of operating a robot cleaner according to another embodiment of the present disclosure.

FIG. 19 is a view illustrating a method of operating a robot cleaner according to another embodiment of the present disclosure.

The processor 180 of the robot cleaner 100 acquires a three-dimensional data (hereinafter referred to as 3D data) and bumper event data through the sensing unit 140 while the robot cleaner travels along a cleaning route (S1901).

The 3D sensor may be the depth sensor described with reference to FIG. 4. The 3D sensor may be provided on a front surface of the main body of the robot cleaner 100.

When the 3D sensor is a depth sensor, light emitted from a light emitting unit (not shown) and reflected from an object may be detected. The depth sensor may measure a distance from the object based on a difference in time when the returned light is detected and the amount of returned light.

The depth sensor may acquire two-dimensional (2D) image data or 3D image data of the periphery of the robot cleaner 100 based on a measured distance between the objects.

A plurality of 3D sensors may be disposed on the front surface of the main body of the robot cleaner 100.

Meanwhile, the robot cleaner 100 may acquire a bumper event through a bumper sensor provided in a bumper 190. The bumper sensor may measure the amount of impact applied to the bumper and generate the bumper event data when the measured amount of impact is equal to or greater than a predetermined amount of impact.

The processor 180 of the robot cleaner 100 converts the acquired 3D data and bumper event into surrounding map data and generates a surrounding map (S1903).

The surrounding map data may be used to create the surrounding map of the robot cleaner 100 on a cleaning map based on the current location of the robot cleaner 100.

The processor 180 may store the converted surrounding map data and the surrounding map in the memory 170.

Steps S1901 and S1903 may be performed after the user purchases the robot cleaner 100 and before the robot cleaner 100 experiences a stuck situation.

The surrounding map will be described with reference to FIG. 20.

FIG. 20 is a view illustrating a generated surrounding map using surrounding map data according to an embodiment of the present disclosure.

Referring to FIG. 20, the surrounding map 2000 generated by the surrounding map data is shown.

The surrounding map 2000 may be created by the surrounding map data on the cleaning map based on the current location of the robot cleaner 100.

The processor 180 may convert the 3D data into first-color dots 2001 and 2003 indicating objects.

The processor 180 may convert the bumper event into second-color dots 2010 indicating an obstacle.

The processor 180 may generate the surrounding map 2000 including the converted first-color dots 2001 and 2003 and second-color dots 2010.

FIG. 19 will be described again.

The processor 180 of the robot cleaner 100 determines whether the robot cleaner 100 has experienced a stuck situation based on the converted surrounding map data (S1905).

The processor 180 may determine that the robot cleaner 100 has experienced the stuck situation, when the number of times of occurrence of the bumper event is equal to or greater than a predetermined number on the surrounding map 2000 shown in FIG. 20.

In another example, the processor 180 may determine that the robot cleaner 100 has experienced the stuck situation, when the robot cleaner 100 is located for a predetermined time on the surrounding map 2000 and the number of times of occurrence of the bumper event is equal to or greater than the predetermined number.

In another example, the processor 180 may determine that the robot cleaner 100 has experienced the stuck situation, when the number of times that the bumper event occurs for a certain time is equal to or greater than the predetermined number.

The processor 180 may store the surrounding map at a time point when the robot cleaner experiences the stuck situation in the memory 170 as image data.

The processor 180 of the robot cleaner 100 labels the surrounding map data with the stuck situation (S1907), when the robot cleaner 100 has experienced the stuck situation.

The processor 180 may label the surrounding map data corresponding to the time point when the stuck situation is detected with the stuck situation in order to train the stuck situation recognition model.

That is, the surrounding map data or the surrounding map obtained in step S1903 may be data for training the stuck situation recognition model.

FIG. 21 is a view illustrating a process of determining a time point when a robot cleaner labels surrounding map data with a stuck situation according to an embodiment of the present disclosure.

Referring to FIG. 21, a graph 2100 showing change in bumper event over time is shown.

When the number of times of occurrence of the bumper event measured for a certain time is less than the predetermined number, the processor 180 may label the surrounding map image data corresponding to the certain time with a non-stuck (normal) situation.

When the number of times of occurrence of the bumper event measured for a certain time is equal to or greater than the predetermined number, the processor 180 may label the surrounding map image data corresponding to the certain time with a stuck (wander) situation.

The processor 180 may divide the certain time into a plurality of unit times and label the surrounding map image data corresponding to each divided unit time with the stuck or non-stuck situation. Labeling may be performed by the auto labeler 1410 of FIG. 14.

FIG. 19 will be described again.

The processor 180 of the robot cleaner 100 trains the stuck situation recognition model using the surrounding map data and the labeling data labeled therewith (S1909).

The stuck situation recognition model may be an example of the context recognition model of FIG. 12.

The stuck situation recognition model may refer to a model for inferring the stuck or non-stuck situation of the robot cleaner 100 from the surrounding map data.

The stuck situation recognition model may be an artificial neural network based model subjected to supervised learning using a deep learning algorithm or a machine learning algorithm.

Here, as the artificial neural network of the stuck situation recognition model, any one of support vector machine (SVM) or a convolutional neural network (CNN) may be used.

Steps S1905 to S1909 may be a process of self-training the stuck situation recognition model based on the robot cleaner 100 experiencing the stuck situation.

The process of training the stuck situation recognition model will be described with reference to the following drawing.

Figure 22:
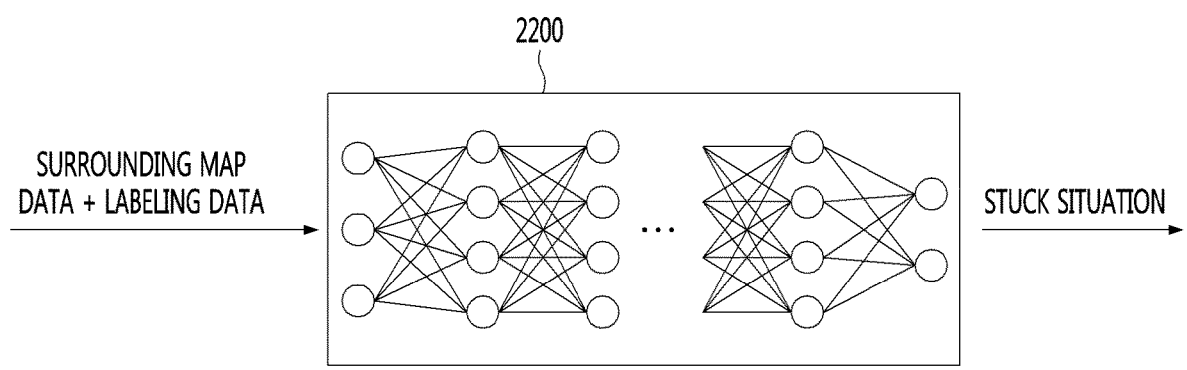
FIG. 22 is a view illustrating a process of training a stuck situation recognition model according to an embodiment of the present disclosure.

FIG. 22 is a view illustrating a process of training a stuck situation recognition model according to an embodiment of the present disclosure.

Referring to FIG. 22, an artificial neural network based stuck situation recognition model 2200 is shown.

The surrounding map data acquired by the robot cleaner 100 may be labeled with labeling data indicating the stuck situation. Labeling may be performed by the auto labeler shown in FIG. 14.

The surrounding map data and the stuck situation labeled therewith may configure a training set and may be used for supervised learning of the stuck situation recognition model 2200.

The processor 180 may extract an input feature vector from the surrounding map data. The extracted input feature vector may be input to the stuck situation recognition model 2200.

The processor 180 may be trained to minimize a cost function indicating a difference between a target feature vector (or a target feature point) which is an inference result of the stuck situation recognition model 2200 and a stuck situation which is labeling data.

The cost function of the stuck situation recognition model 2200 may be expressed by a squared mean of a difference between a label for the stuck situation of the robot cleaner 100 corresponding to training data and a situation inferred from each training data.

In the stuck situation recognition model 2200, model parameters included in the artificial neural network may be determined to minimize the cost function through training.

The target feature point of the stuck situation recognition model 2200 may include an output layer of a single node indicating the normal or abnormal situation of the robot cleaner 100. The target feature point may have a value of 1 when the target feature point indicates the stuck situation and have a value of 0 when the target feature point indicates non-stuck situation. In this case, the output layer of the stuck situation recognition model 2200 may use sigmoid, hyperbolic tangent, etc. as an activation function.

In another example, the target feature point of the stuck situation recognition model 2200 may include output layers of two output nodes indicating the stuck or non-stuck situation of the robot cleaner 100.

That is, the target feature point (target feature vector) may include a stuck situation and a non-stuck situation, may have a value "(1, 0)" when the target feature point indicates the stuck situation, and have a value "(0, 1)" when the target feature point indicates the non-stuck situation. In this case, the output layer of the stuck situation recognition model 2200 may use Softmax as an activation function.

FIG. 19 will be described again.

The subsequent steps may be a process performed by the robot cleaner 100 after first training of the stuck situation recognition model 2200 is completed.

Thereafter, the processor 180 of the robot cleaner 100 acquires new 3D data and a new bumper event through the sensing unit 140 while the robot cleaner travels along the cleaning route (S1911).

The processor 180 converts the acquired 3D data and bumper event into surrounding map data and generates a surrounding map (S1913).

The processor 180 of the robot cleaner 100 infers whether the robot cleaner 100 is in the stuck situation from the generated surrounding map using the trained stuck situation recognition model (S1913).

The processor 180 may determine whether the robot cleaner 100 is in the stuck situation from image data corresponding to the surrounding map using the stuck situation recognition model.

The processor 180 of the robot cleaner 100 performs S805 of FIG. 8 which is a step of avoiding the stuck situation and the subsequent steps thereof, when the stuck situation is inferred by the stuck situation recognition model (S1915).

That is, the processor 180 may change the traveling angle of the robot cleaner 100 in order to prevent the stuck situation, when it is inferred that the robot cleaner 100 is in the stuck situation. For this, refer to the embodiment of FIG. 8.

The processor 180 of the robot cleaner 100 drives the robot cleaner along the existing cleaning route (SS801 of FIG. 8), when the non-stuck situation is inferred by the stuck situation recognition model (S1915).

Meanwhile, the robot cleaner 100 may perform self-validation in order to reduce the error of the stuck situation recognition model 2200 or in order to cope with change in surrounding environment. As self-validation is performed, the stuck situation recognition model 2200 may be continuously updated.

Figure 23:
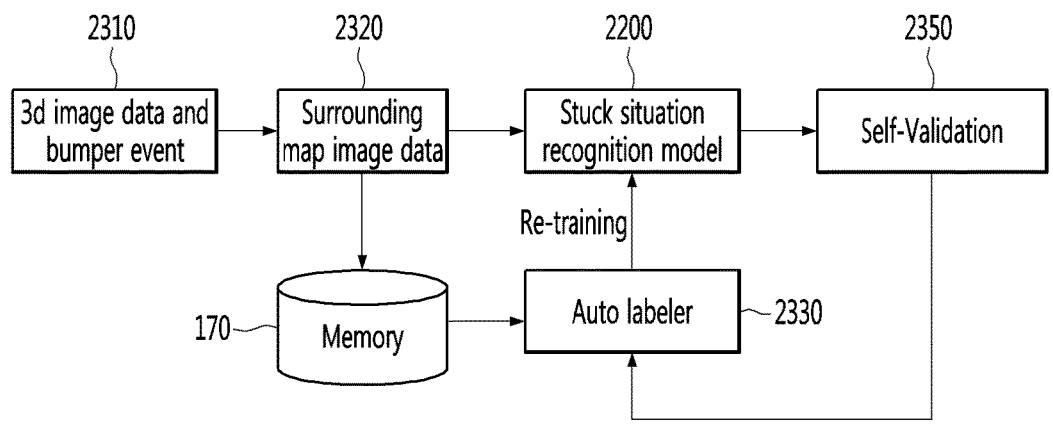
FIG. 23 is a view showing a process of performing self-validation with respect to a stuck situation recognition model at a robot cleaner according to an embodiment of the present disclosure.

FIG. 23 is a view showing a process of performing self-validation with respect to a stuck situation recognition model at a robot cleaner according to an embodiment of the present disclosure, and FIG. 24 is a view illustrating a detailed method of self-validation.

Referring to FIG. 23, the processor 180 of the robot cleaner 100 acquires sensing data 2310 including 3D image data and a bumper event through the sensing unit 140.

The processor 180 converts the acquired sensing data 2310 into surrounding map image data 2320.

The converted surrounding map image data 2320 may be stored in the memory 170. The surrounding map image data 2320 may be acquired at an interval of 1 ms but this is merely an example.

The processor 180 may infer the stuck situation or the normal situation from the surrounding map image data 2320 using the stuck situation recognition model 2200, the first training of which is completed.

The processor 180 may perform self-validation 2350 with respect to the inferred stuck situation or normal situation (or non-stuck situation).

Self-validation 2350 may be performed in order to cope with change in surrounding environment or in order to reduce the error of the stuck situation recognition model 2200.

Self-validation 2350 will be described with reference to FIG. 24.

First, the case where the inference result of the stuck situation recognition model 2200 is a normal situation (or a non-stuck situation) will be described.

When it is inferred that the robot cleaner 100 is in the stuck situation, the processor 180 may drive the robot cleaner 100 along the existing cleaning route. Thereafter, the processor 180 may determine whether the stuck situation of the robot cleaner 100 has occurred.

The processor 180 may determine that the stuck situation has occurred when the number of times of occurrence of the bumper event is equal to or greater than a predetermined number during a certain time.

The processor 180 may determine that the stuck situation has not occurred when the number of times of occurrence of the bumper event is less than the predetermined number during the certain time.

The processor 180 may not take further action when the stuck situation has not occurred.

The processor 180 may re-train the stuck situation recognition model 2200 when the stuck situation has occurred.

The processor 180 or the auto labeler 2330 may label the surrounding map image data used to determine the inference result of the non-stuck situation with the stuck situation.

The surrounding map image data and the labeling data may configure a training data set and may be used to re-train the stuck situation recognition model 2200.

Meanwhile, the case where the inference result of the stuck situation recognition model 2200 is the stuck situation will be described.

The processor 180 may drive the robot cleaner 100 along the existing cleaning route when it is inferred that the robot cleaner 100 is in the struck situation.

Thereafter, the processor 180 may determine whether the stuck situation of the robot cleaner 100 has occurred.

The processor 180 may determine that an error is detected when the stuck situation has not occurred. In this case, the processor 180 may re-train the stuck situation recognition model 2200.

The processor 180 or the auto labeler 2330 may label the surrounding map image data used to infer the stuck situation with the non-stuck situation. The surrounding map image data and the labeling data may configure a training data set and may be used to re-train the stuck situation recognition model 2200.

Meanwhile, the processor 180 may determine that the inference result is correct when the stuck situation has occurred. In this case, the processor 180 may control the driving unit 160 in order to avoid the stuck situation.

Specifically, the processor 180 may determine the rotation angle of the robot cleaner 100 as in step S805 of FIG. 8 and reverse the robot cleaner after rotating by the determined rotation angle, thereby avoiding the stuck situation. For this, refer to the description of FIG. 8.

The robot cleaner 100 according to the embodiment of the present disclosure may perform self-validation with respect to the stuck situation recognition model 2200, thereby continuously updating the stuck situation recognition model 2200.

Therefore, the robot cleaner 100 may actively cope with change in surrounding situation. In addition, it is possible to increase accuracy of training model, by improving training errors of the stuck situation recognition model 2200.

Next, the coping abilities of the robot cleaner 100 when the stuck area is determined based on the location and when the stuck area is determined based on surrounding situation recognition are compared.

Figure 25A:
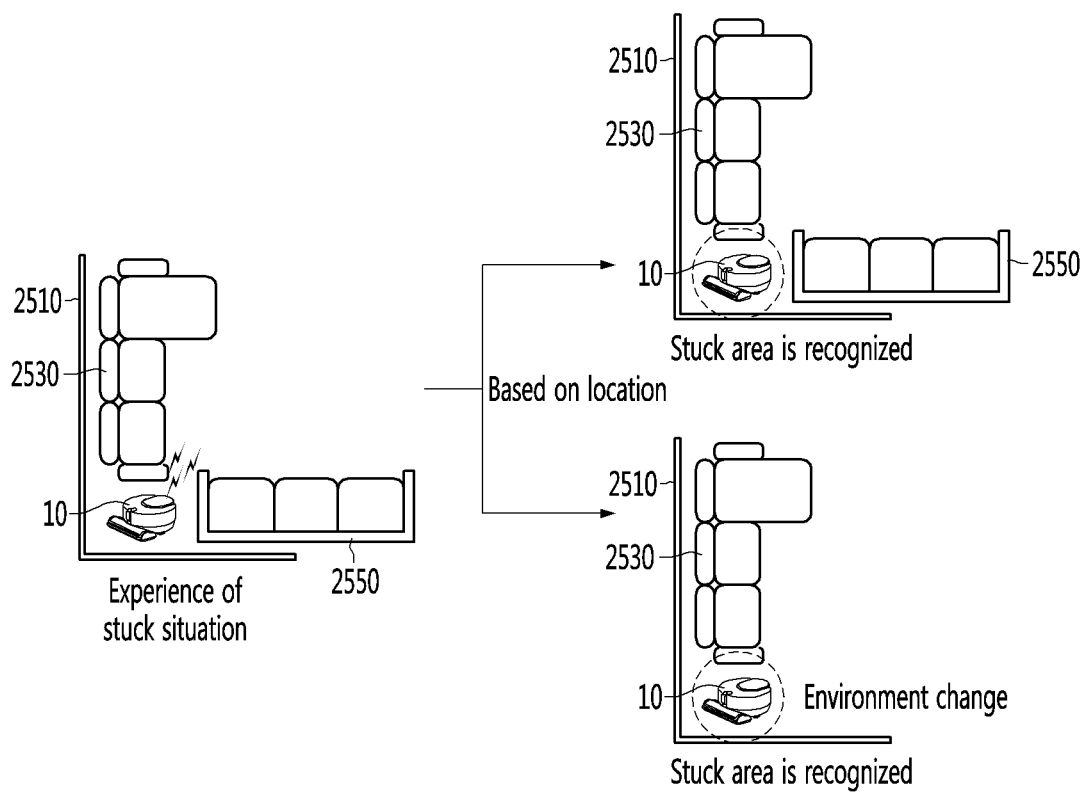
FIG. 25a is a view illustrating a coping method of a robot cleaner when reentering a stuck area based on the location of a stuck area according to the conventional technology.
Figure 25B:
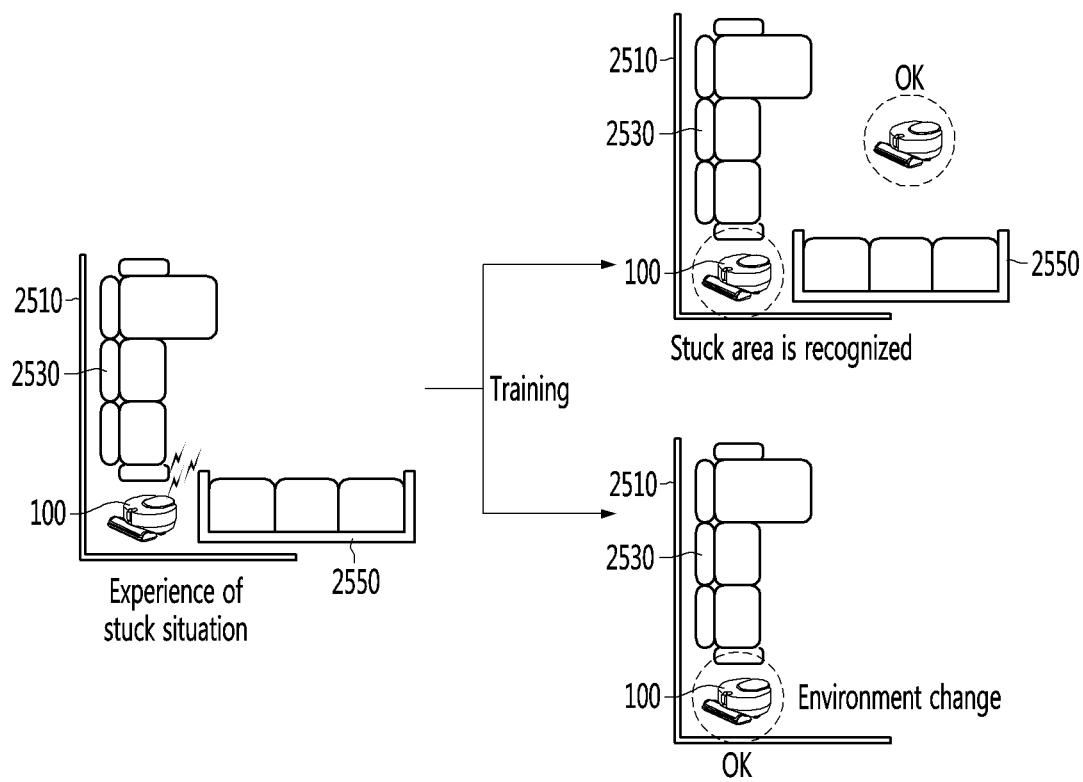
FIG. 25b is a view illustrating a coping method of a robot cleaner when reentering a stuck area based on recognition of a surrounding situation according to an embodiment of the present disclosure.

FIG. 25a is a view illustrating a coping method of a robot cleaner when reentering a stuck area based on the location of a stuck area according to the conventional technology, and FIG. 25b is a view illustrating a coping method of a robot cleaner when reentering a stuck area based on recognition of a surrounding situation according to an embodiment of the present disclosure.

First, FIG. 25a will be described. The conventional robot cleaner 10 experiences a stuck situation through a wall 2510, a first obstacle 2530 and a second obstacle 2550. The robot cleaner 10 stores the location of the stuck area when experiencing the stuck situation.

When the robot cleaner 10 enters the stuck area in the future, the robot cleaner 10 determines that the stuck area is recognized if the second obstacle 2550 is maintained or even if the second obstacle 2550 is removed. That is, the robot cleaner 10 travels while avoiding the obstacle according to recognition of the stuck area. In this case, when the second obstacle 2550 is removed, the robot cleaner 10 recognizes the stuck area based on the location and travels for avoiding the stuck area.

Even though avoidance is unnecessary due to change in surrounding environment, the conventional robot cleaner 10 performs avoidance. Therefore, the stuck area cannot be cleaned.

Next, FIG. 25b will be described.

The robot cleaner 100 according to the embodiment of the present disclosure experiences the stuck situation through a wall 2510, a first obstacle 2530 and a second obstacle 2550.

The robot cleaner 100 may label the surrounding map image data indicating the surrounding situation with the stuck situation when experiencing the stuck situation and train the stuck situation recognition model 2200.

Thereafter, when the second obstacle 2550 is removed, the robot cleaner 100 enters the stuck area in which the robot cleaner has experienced the stuck situation. The robot cleaner 100 may infer the stuck situation from the re-acquired surrounding map image data using the stuck situation recognition model 2200.

The robot cleaner 100 may recognize change in surrounding environment such as removal of the second obstacle 2550 and may not determine the stuck situation when entering the existing stuck area.

That is, the robot cleaner 100 may infer the current situation as the non-stuck situation from the re-acquired surrounding map image data using the stuck situation recognition model 2200 even when entering the existing stuck area. Therefore, unlike the location based method of FIG. 25a, it is possible to more efficiently perform cleaning, by recognizing change in surrounding environment.

It may be determined that the robot cleaner 100 is in the stuck situation when entering the stuck area, even if the second obstacle 2550 has been removed.

The robot cleaner 100 may detect errors of determination of the stuck situation through the self-validation method described with reference to FIG. 24 and re-train the stuck situation recognition model 2200.

The robot cleaner 100 may not determine the stuck region when entering the stuck area in consideration of removal of the second obstacle 2550 according to re-training of the stuck situation recognition model 2200.

According to the embodiment of the present disclosure, the robot cleaner 100 may recognize change in surrounding environment and determine the stuck area in consideration of change in surrounding environment. Accordingly, it is possible to greatly improve the ability to actively cope with change in surrounding environment and to more efficiently perform cleaning.

According to the embodiment of the present disclosure, since the robot cleaner travels while detecting change in the environment of the stuck area, the robot cleaner can actively cope with change in surrounding environment.

According to the embodiment of the present disclosure, since the robot cleaner continuously updates the stuck situation recognition mode, it is possible to accurately confirm the stuck situation and efficiently perform cleaning.

The present disclosure mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc.

What is claimed is:

1. A robot cleaner for recognizing a stuck situation through artificial intelligence, the robot cleaner comprising:
a driving motor to drive the robot cleaner;
a sensor configured to acquire three-dimensional (3D) image data and a bumper event;
a memory configured to store a stuck situation recognition model for inferring the stuck situation of the robot cleaner; and
a processor configured to:
convert the 3D image data and the bumper event into surrounding map image data,
inter the stuck situation of the robot cleaner from the surrounding map image data using the stuck situation recognition model,
control the driving motor according to an inference result,
measure a current traveling angle of the robot cleaner at a time point when the stuck situation is detected, and
determine a rotation angle of the robot cleaner for escaping the stuck situation based on the measured current traveling angle and a plurality of traveling angles measured at a plurality of time points before the stuck situation is detected.

2. The robot cleaner of claim 1,
wherein the stuck situation recognition model is an artificial neural network based model subjected to supervised learning through a deep learning algorithm or a machine learning algorithm, and
wherein a training data set used to train the stuck situation recognition model includes the acquired surrounding map image data for training and labeling data indicating the stuck situation labeled therewith while the robot cleaner travels.

3. The robot cleaner of claim 2,
wherein the processor drives the robot cleaner along a cleaning route when the inference result of the stuck situation recognition model is a non-stuck situation and determines whether the robot cleaner is stuck.

4. The robot cleaner of claim 3, wherein the processor re-labels the surrounding map image data with the stuck situation when the robot cleaner is stuck and re-trains the stuck situation recognition model.

5. The robot cleaner of claim 2, wherein the processor drives the robot cleaner along a cleaning route when the inference result of the stuck situation recognition model is a stuck situation and determines whether the robot cleaner is stuck.

6. The robot cleaner of claim 5, wherein the processor re-labels the surrounding map image data with the stuck situation when the robot cleaner is not stuck and re-trains the stuck situation recognition model.

7. The robot cleaner of claim 5, wherein the processor controls the driving motor to rotate the robot cleaner by the determined rotation angle, and controls the driving motor to reverse the robot cleaner by a certain distance after the robot cleaner rotates by the rotation angle.

8. The robot cleaner of claim 1,
wherein the processor obtains a value by subtracting an average angle of the plurality of traveling angles from the current traveling angle, and determines the value as the rotation angle, and
wherein traveling speeds of the robot cleaner measured at the plurality of time points are equal to or greater than a threshold speed.

9. The robot cleaner of claim 1, wherein the sensor includes a depth sensor configured to sense the 3D image data and a bumper sensor configured to measure an amount of impact applied to a bumper of the robot cleaner and generate a bumper event when the amount of impact is equal to or greater than a predetermined amount of impact.

10. The robot cleaner of 9, wherein the processor determines that the robot cleaner is in a stuck situation, when the number of times of occurrence of the bumper event is equal to or greater than a predetermined number.

11. The robot cleaner of claim 1, wherein the surrounding map image data indicates a surrounding obstacle situation of the robot cleaner on a cleaning map indicating a cleaning area of the robot cleaner.

12. The robot cleaner of claim 1, wherein the surrounding map image data includes a cleaning map indicating a cleaning area of the robot cleaner, and
wherein the processor is further configured to generate a virtual wall on the cleaning map to prevent the robot cleaner from entering a location in which the stuck situation was detected.

13. A method of operating a robot cleaner for recognizing a stuck situation through artificial intelligence, the method comprising:
acquiring three-dimensional (3D) image data and a bumper event;
converting the acquired 3D image data and bumper event into surrounding map image data;
inferring the stuck situation of the robot cleaner from the surrounding map image data using a stuck situation recognition model:
controlling a driving motor according to an inference result;
measuring a current traveling angle of the robot cleaner at a time point when the stuck situation is detected; and
determining a rotation angle of the robot cleaner for escaping the stuck situation based on the measured current traveling angle and a plurality of traveling angles measured at a plurality of time points before the stuck situation is detected.

14. The method of claim 13,
wherein the stuck situation recognition model is an artificial neural network based model subjected to supervised learning through a deep learning algorithm or a machine learning algorithm, and
wherein a training data set used to train the stuck situation recognition model includes the acquired surrounding map image data for training and labeling data indicating the stuck situation labeled therewith while the robot cleaner travels.

15. The method of claim 14, further comprising:
driving the robot cleaner along a cleaning route when the inference result of the stuck situation recognition model is a non-stuck situation; and
determining whether the robot cleaner is stuck.

16. The method of claim 15, further comprising:
re-labeling the surrounding map image data with the stuck situation when the robot cleaner is stuck; and
re-training the stuck situation recognition model according to labeling.

17. The method of claim 14, further comprising:
driving the robot cleaner along a cleaning route when the inference result of the stuck situation recognition model is a stuck situation; and
determining whether the robot cleaner is stuck.

18. The method of claim 17, further comprising:
re-labeling the surrounding map image data with the stuck situation when the robot cleaner is not stuck; and
re-training the stuck situation recognition model.

19. The method of claim 17, further comprising:
controlling the driving motor of the robot cleaner to rotate the robot cleaner by the determined rotation angle; and
controlling the driving motor to reverse the robot cleaner by a certain distance after the robot cleaner rotates by the rotation angle.

20. The method of claim 13, wherein the surrounding map image data includes a cleaning map indicating a cleaning area of the robot cleaner, and
wherein the method further comprises generating a virtual wall on the cleaning map to prevent the robot cleaner from entering a location in which the stuck situation was detected.

\* \* \* \* \*